United States Patent
Hori

(10) Patent No.: US 8,526,120 B2
(45) Date of Patent: Sep. 3, 2013

(54) ZOOM LENS AND IMAGE PICKUP APPARATUS INCLUDING THE SAME

(75) Inventor: Masao Hori, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 37 days.

(21) Appl. No.: 13/211,379

(22) Filed: Aug. 17, 2011

(65) Prior Publication Data

US 2012/0063002 A1    Mar. 15, 2012

(30) Foreign Application Priority Data

Sep. 15, 2010  (JP) ................................. 2010-206634

(51) Int. Cl.
*G02B 15/14*  (2006.01)

(52) U.S. Cl.
USPC .......................................... 359/687; 359/686

(58) Field of Classification Search
USPC .................... 359/676, 677, 687, 686
See application file for complete search history.

(56) References Cited

U.S. PATENT DOCUMENTS

| 4,690,513 | A | * | 9/1987 | Takahashi et al. | ............ 359/686 |
| 6,956,704 | B2 | | 10/2005 | Oomura et al. | |
| 7,583,449 | B2 | | 9/2009 | Kusaka | |
| 7,903,345 | B2 | | 3/2011 | Nurishi | |
| 2009/0296231 | A1 | * | 12/2009 | Shirasuna | ..................... 359/687 |

FOREIGN PATENT DOCUMENTS

| JP | 2004-264457 A | 9/2004 |
| JP | 2008-197533 A | 8/2008 |
| JP | 2010-091788 A | 4/2010 |

* cited by examiner

*Primary Examiner* — Alicia M Harrington
(74) *Attorney, Agent, or Firm* — Rossi, Kimms & McDowell LLP

(57) ABSTRACT

A zoom lens, including in order from an object side to an image side: a first lens unit; a second lens unit; a third lens unit; and a fourth lens unit, in which the second lens unit includes four lenses as a whole, in which a first lens and a second lens are disposed successively in order from the object side to the image side, and the following conditional expressions are satisfied: $7.8 < f1/|f2| < 12.0$; $1.20 < f21/f2 < 1.63$; and $0.04 < O12/D2 < 0.15$, where f1 represents a focal length of the first lens unit, f2 represents a focal length of the second lens unit, f21 represents a focal length of the first lens, O12 represents a distance from a lens surface vertex of the first lens on the object side to an object side principal point position of the second lens unit, and D2 represents a thickness of the second lens unit on an optical axis.

19 Claims, 13 Drawing Sheets

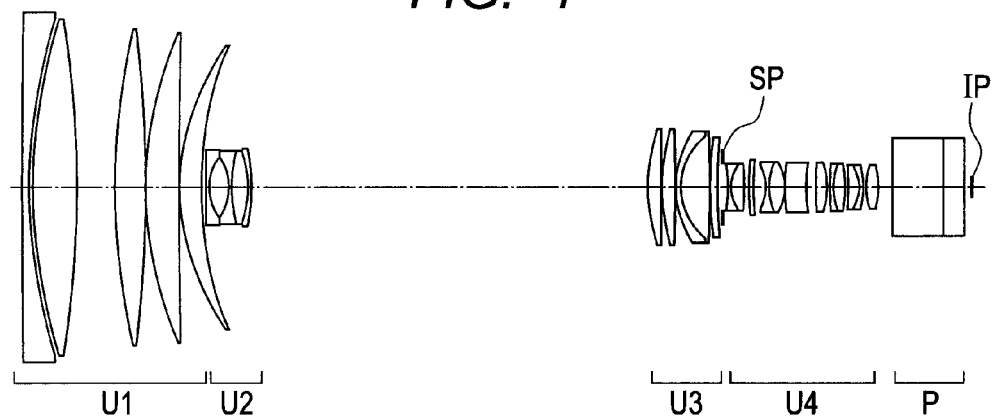
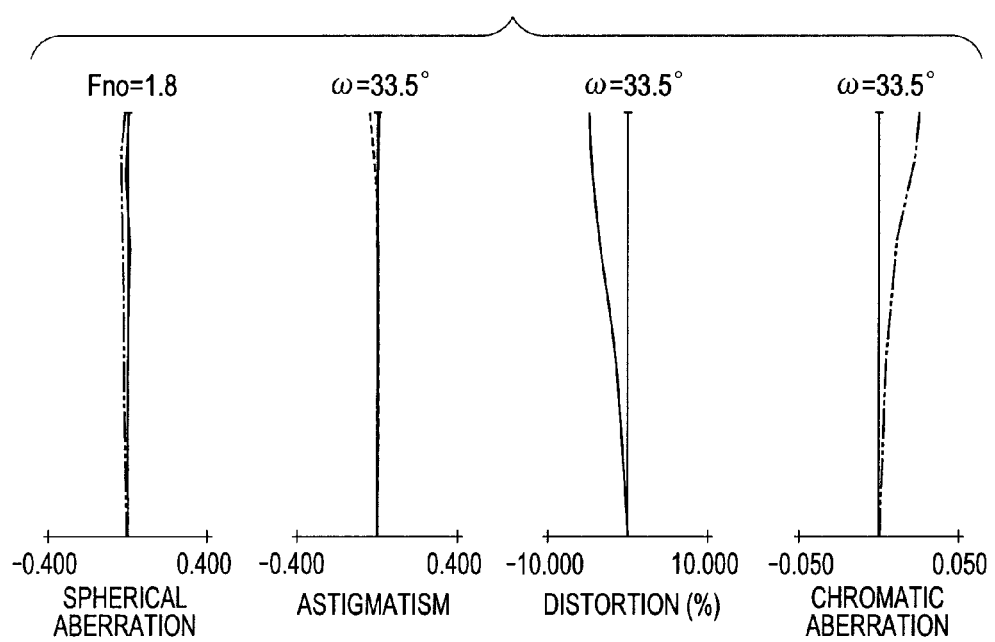

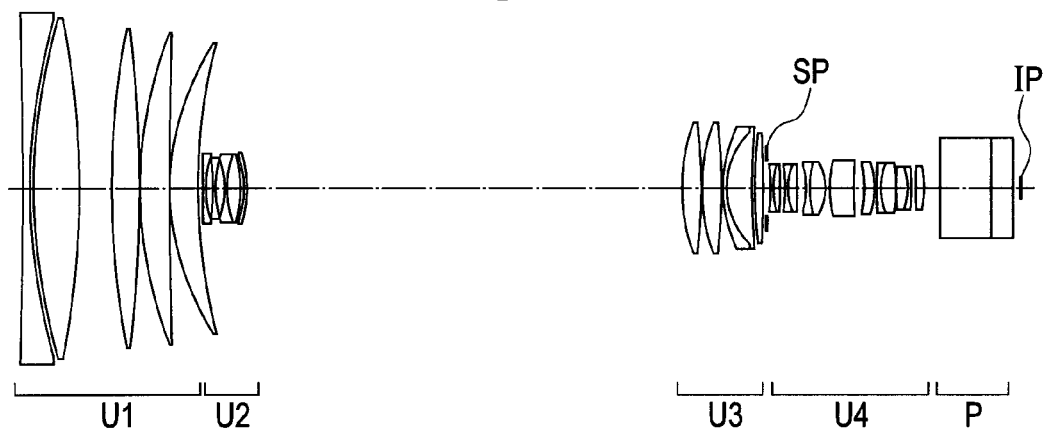
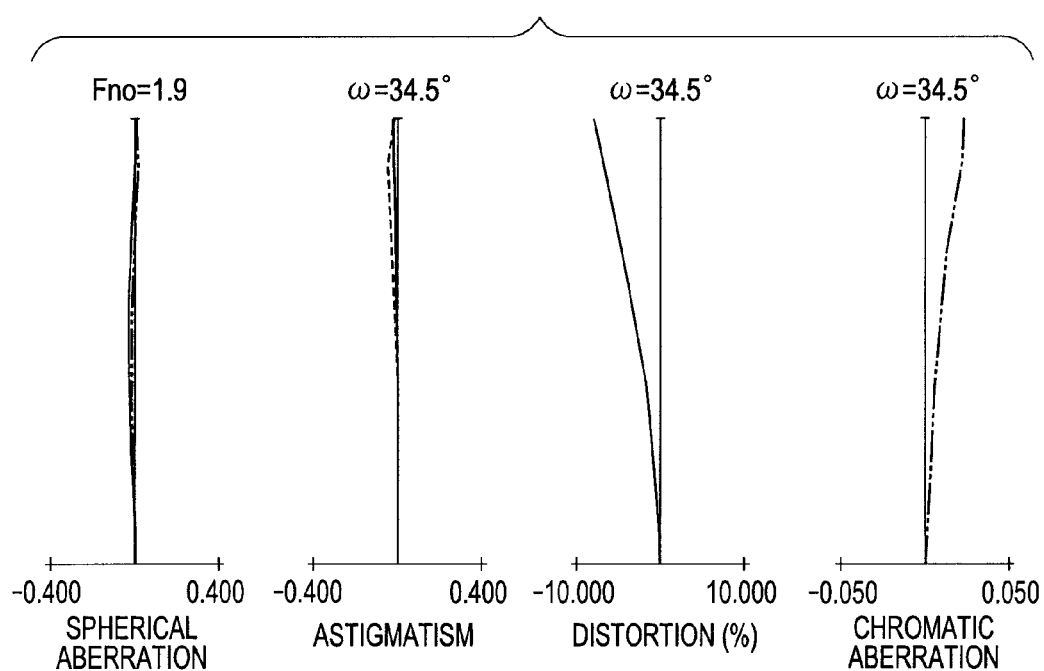

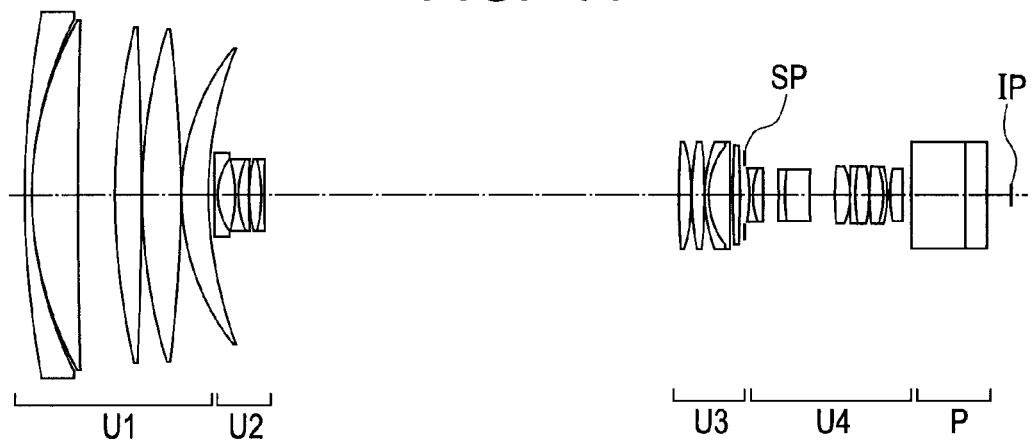
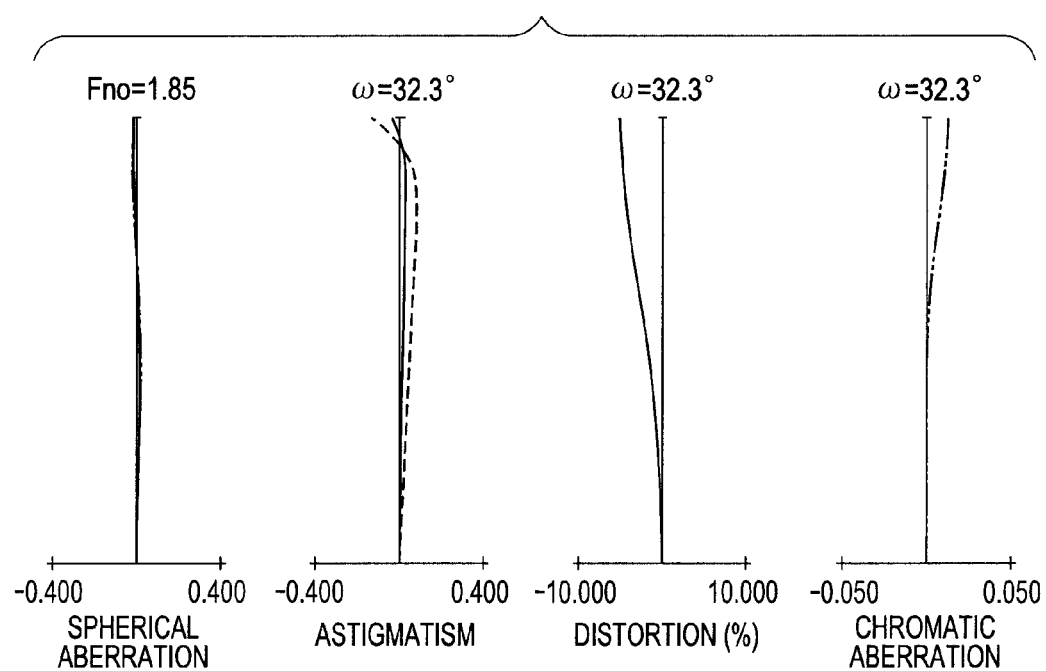

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and more particularly, to a zoom lens suitable for use in a broadcasting TV camera, a video camera, a digital still camera and a silver-halide film camera.

2. Description of the Related Art

In recent years, a zoom lens having a high zoom ratio, a wide angle of field and a high optical performance is desired for use in an image pickup apparatus such as a TV camera, a silver-halide film camera, a digital camera or a video camera.

A positive lead type four-unit zoom lens has been known as the zoom lens having a high zoom ratio and a wide angle of field. In the four-unit zoom lens, four lens units are provided in total, and one of the lens units located on the most object side has a positive refractive power.

For example, there has been known a four-unit zoom lens including a first lens unit having a positive refractive power, a second lens unit having a negative refractive power for magnification-varying, a third lens unit for correcting image plane variation, and a fourth lens unit having a positive refractive power (Japanese Patent Application Laid-Open No. 2004-264457, Japanese Patent Application Laid-Open No. 2008-197533 and Japanese Patent Application Laid-Open No. 2010-091788).

Japanese Patent Application Laid-Open No. 2004-264457 discloses a zoom lens having an angle of field of 60.93° at a wide-angle end and having a zoom magnification of about 96. Japanese Patent Application Laid-Open No. 2008-197533 discloses a zoom lens having an angle of field of 69.02° at the wide-angle end and having a zoom magnification of about 106. Japanese Patent Application Laid-Open No. 2010-091788 discloses a zoom lens having an angle of field of 62.86° at the wide-angle end and having a zoom magnification of about 120.

When a high zoom ratio (high magnification) is to be achieved in the above-mentioned four-unit zoom lenses, it is necessary to secure a long movable range for the second lens unit for magnification-varying, and thus the lens diameter of the first lens unit disposed on the most object side tends to be increased. Further, when a wide angle of field is to be achieved, it is necessary to secure a wide incident angle for beams to be received by the first lens unit, and thus the lens diameter of the first lens unit tends to be increased as well. In order to prevent an increase in the lens diameter of the first lens unit while achieving both a wide angle of field and a high magnification, it is important to reduce the size of the second lens unit for magnification-varying, and to shift a principal point position of the second lens unit toward the object side, which is a reference position for incident beams.

In the four-unit zoom lenses having the above-mentioned structure, in order to achieve a high zoom ratio and a wide angle of field, and also to achieve high optical performance over the entire zoom range while achieving a size reduction for the entire lens system, it is important to appropriately set the refractive power of the first lens unit, the lens structure of the second lens unit for magnification-varying, and the like.

If those settings are inappropriate, attaining a compact zoom lens having a high zoom ratio and a wide angle of field becomes difficult.

SUMMARY OF THE INVENTION

The present invention has an object to provide a zoom lens which readily allows a size and weight reduction for the entire lens system while achieving both a wide angle of field and a high zoom ratio, and to provide an image pickup apparatus including the zoom lens.

A zoom lens according to the present invention includes in order from an object side to an image side: a first lens unit including a focusing lens unit and having a positive refractive power; a second lens unit having a negative refractive power and moving for magnification-varying; a third lens unit moving for magnification-varying; and a fourth lens unit having a positive refractive power, in which the second lens unit includes four lenses as a whole including a first lens having a negative refractive power and a second lens having a negative refractive power and the first lens and the second lens are disposed successively in order from the object side to the image side, and the following conditional expressions are satisfied:

$$7.8 < f1/|f2| < 12.0;$$

$$1.20 < f21/f2 < 1.63; \text{ and}$$

$$0.04 < O12/D2 < 0.15,$$

where f1 represents a focal length of the first lens unit, f2 represents a focal length of the second lens unit, f21 represents a focal length of the first lens, O12 represents a distance from a lens surface vertex of the first lens on the object side to an object side principal point position of the second lens unit, and D2 represents a thickness of the second lens unit on an optical axis.

According to the present invention, the zoom lens which readily allows a size and weight reduction for the entire lens system while achieving both a wide angle of field and a high zoom ratio can be obtained.

Further features of the present invention will become apparent from the following description of exemplary embodiments with reference to the attached drawings.

BRIEF DESCRIPTION OF THE DRAWINGS

FIG. 1 is a lens cross-sectional view in a state in which focus is at infinity at a wide-angle end according to Numerical Embodiment 1.

FIG. 2A is an aberration graph in the state in which focus is at infinity at the wide-angle end according to Numerical Embodiment 1.

FIG. 7 is a lens cross-sectional view in the state in which focus is at infinity at a wide-angle end according to Numerical Embodiment 4.

FIG. 8A is an aberration graph in the state in which focus is at infinity at the wide-angle end according to Numerical Embodiment 4.

FIG. 11 is a lens cross-sectional view in the state in which focus is at infinity at a wide-angle end according to Numerical Embodiment 6.

FIG. 12A is an aberration graph in the state in which focus is at infinity at the wide-angle end according to Numerical Embodiment 6.

DESCRIPTION OF THE EMBODIMENTS

Preferred embodiments of the present invention will now be described in detail in accordance with the accompanying drawings.

A zoom lens of the present invention includes in order from an object side to an image side: a first lens unit including a focusing lens unit and having a positive refractive power; a second lens unit including a magnification-varying lens unit and having a negative refractive power; a third lens unit having a positive refractive power for correcting image plane variation caused by magnification-varying; and a fourth lens unit having a positive refractive power for imaging. The second lens unit includes four lenses as a whole, in which a first lens having a negative refractive power and a second lens having a negative refractive power are successively disposed in order from the object side to the image side.

The zoom lens of the present invention may include, in the fourth lens unit which has the positive refractive power and does not move for the magnification-varying, a partial lens unit which is removable from an optical path and changes the focal length of the entire zoom lens.

Figure 2B:
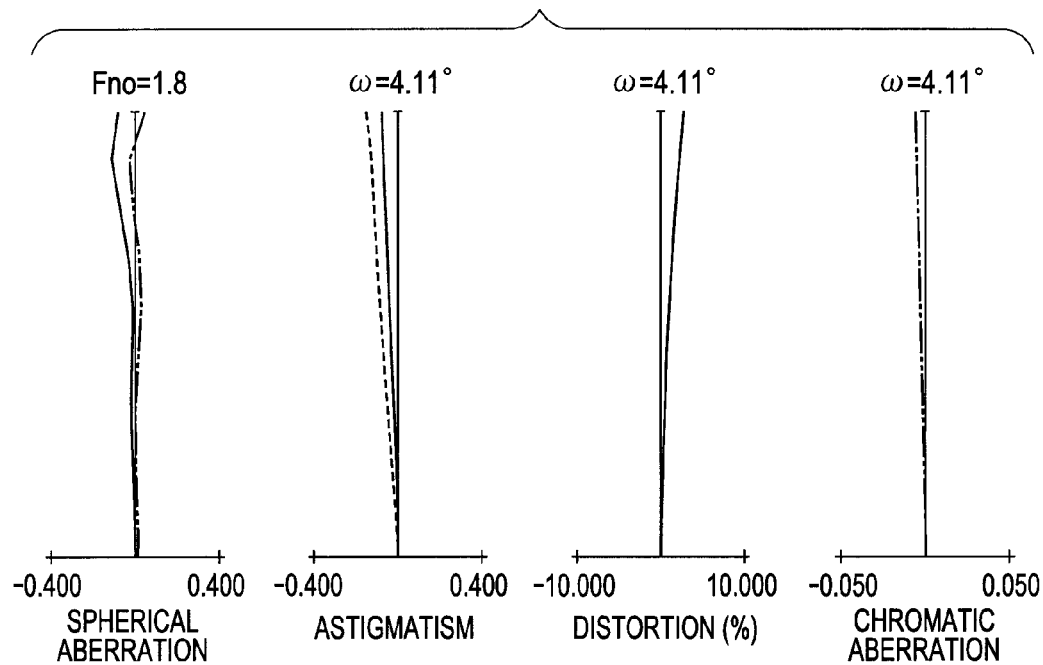
FIG. 2B is an aberration graph in the state in which focus is at infinity at an intermediate zoom position according to Numerical Embodiment 1.
Figure 2C:
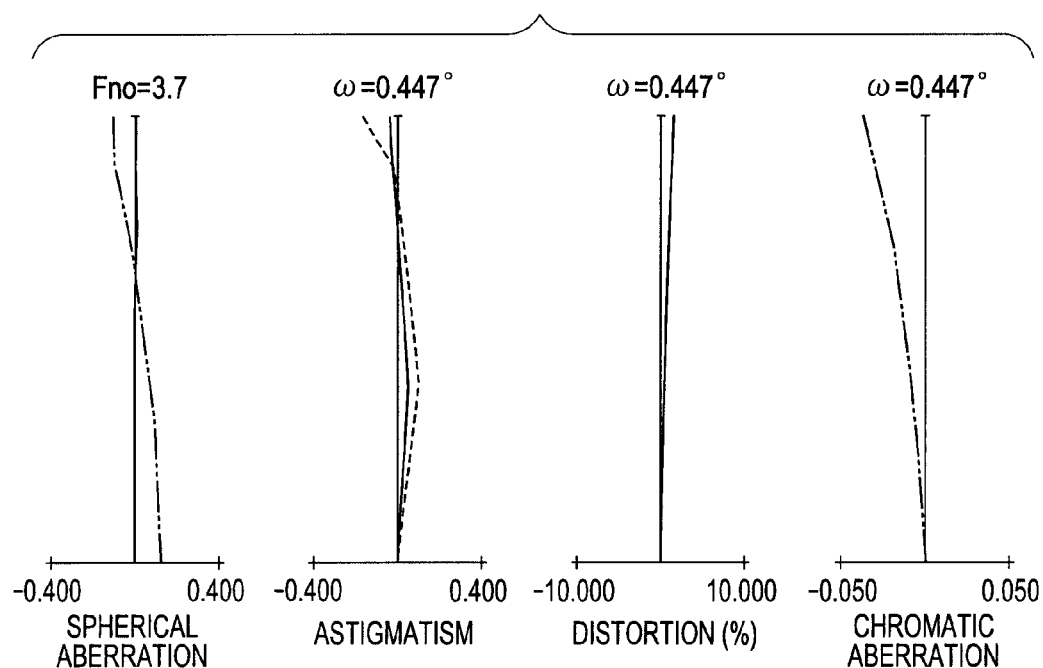
FIG. 2C is an aberration graph in the state in which focus is at infinity at a telephoto end according to Numerical Embodiment 1.

FIG. 1 is a lens cross-sectional view in a state in which an object at infinity is in focus at a wide-angle end (focal length f=8.3 mm) (short focal length end) of a zoom lens according to Embodiment 1 (Numerical Embodiment 1) of the present invention. FIGS. 2A, 2B and 2C are aberration graphs in the state in which an object at infinity is in focus at the wide-angle end, at an intermediate zoom position (focal length f=76.52 mm), and at a telephoto end (focal length f=705.50 mm) (long focal length end), respectively, according to Numerical Embodiment 1. Note that, the values of the focal length and an object distance are expressed in millimeters in numerical embodiments. The same applies to all embodiments described below.

Figure 3:
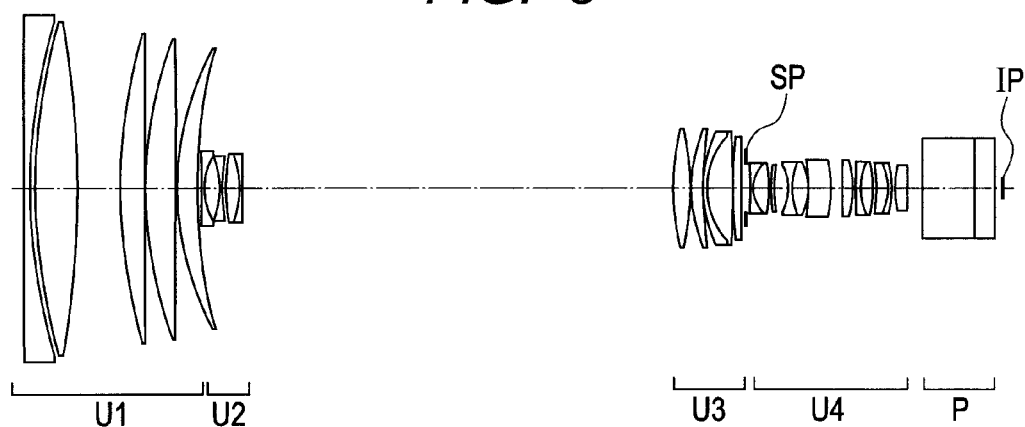
FIG. 3 is a lens cross-sectional view in the state in which focus is at infinity at a wide-angle end according to Numerical Embodiment 2.
Figure 4A:
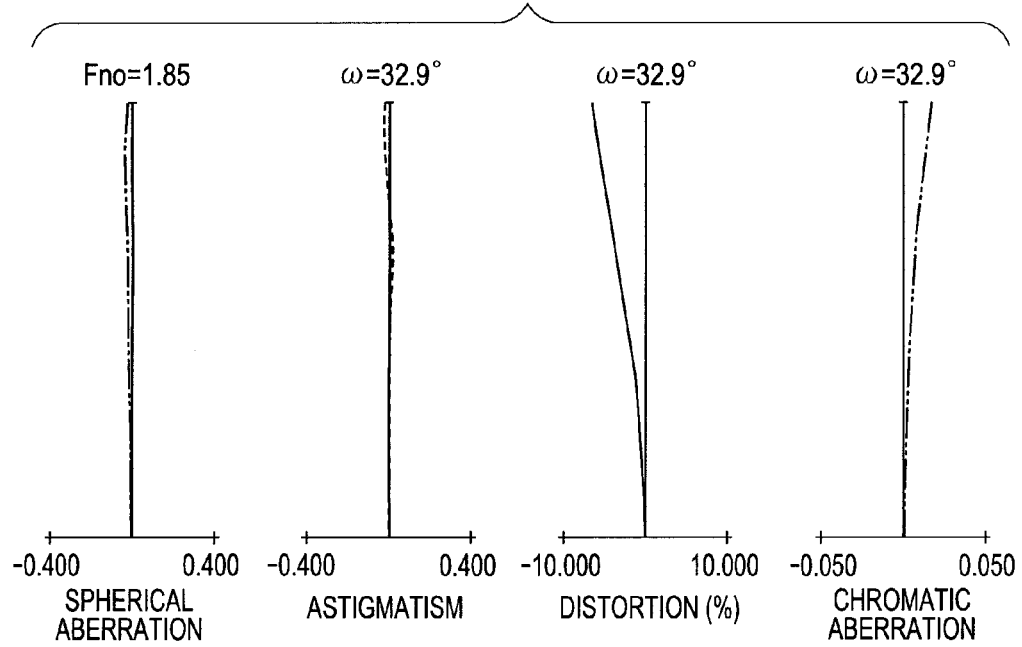
FIG. 4A is an aberration graph in the state in which focus is at infinity at the wide-angle end according to Numerical Embodiment 2.
Figure 4B:
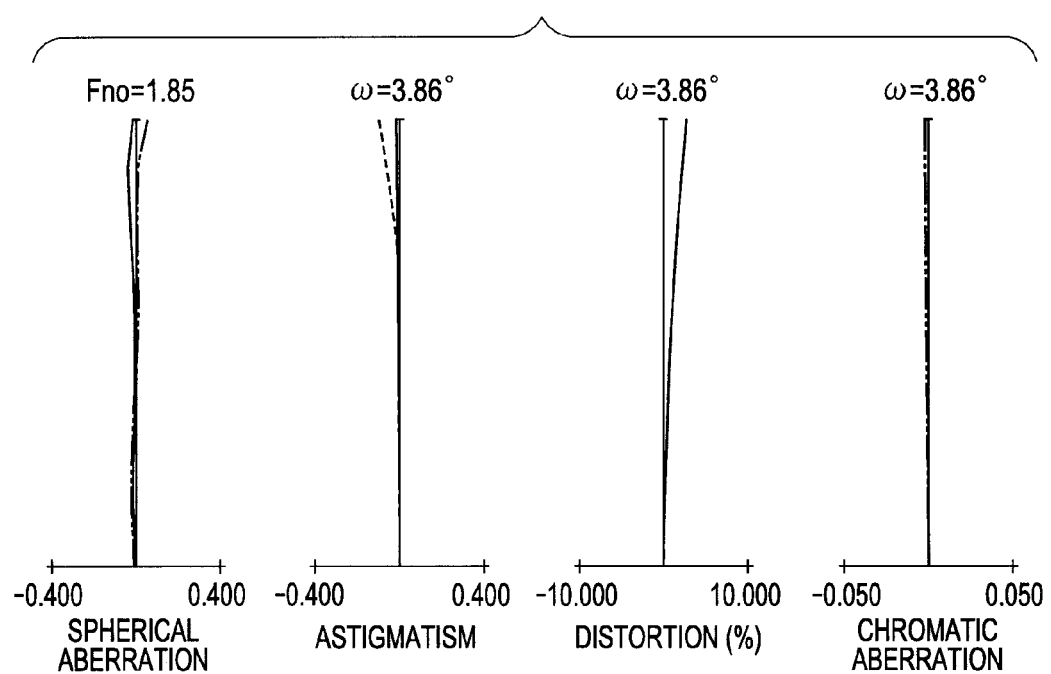
FIG. 4B is an aberration graph in the state in which focus is at infinity at an intermediate zoom position according to Numerical Embodiment 2.
Figure 4C:
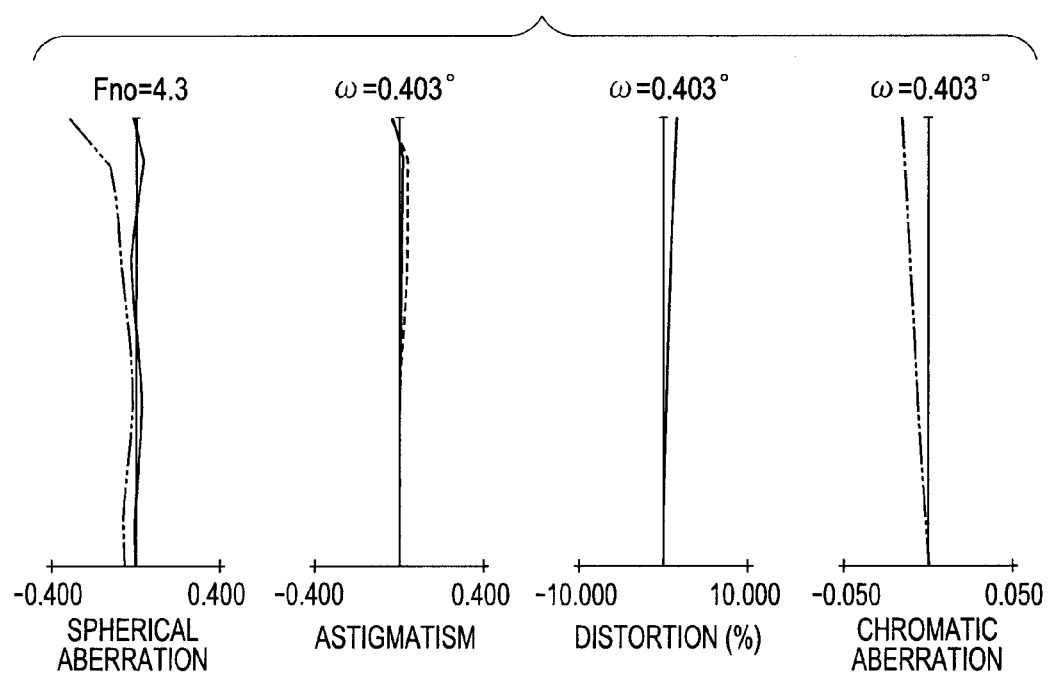
FIG. 4C is an aberration graph in the state in which focus is at infinity at a telephoto end according to Numerical Embodiment 2.

FIG. 3 is a lens cross-sectional view in the state in which an object at infinity is in focus at a wide-angle end (f=8.50 mm) of a zoom lens system according to Embodiment 2 (Numerical Embodiment 2) of the present invention. FIGS. 4A, 4B and 4C are aberration graphs in the state in which an object at infinity is in focus at the wide-angle end, at an intermediate zoom position (focal length f=81.53 mm), and at a telephoto end (f=782.00 mm), respectively, according to Numerical Embodiment 2.

Figure 5:
FIG. 5 is a lens cross-sectional view in the state in which focus is at infinity at a wide-angle end according to Numerical Embodiment 3.
Figure 6A:
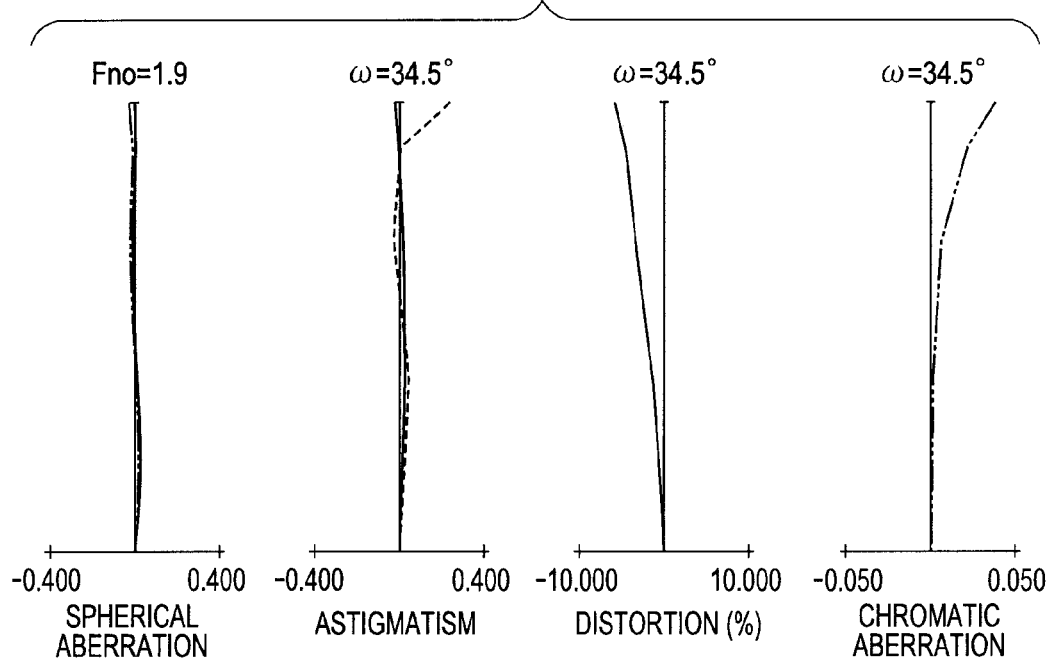
FIG. 6A is an aberration graph in the state in which focus is at infinity at the wide-angle end according to Numerical Embodiment 3.
Figure 6B:
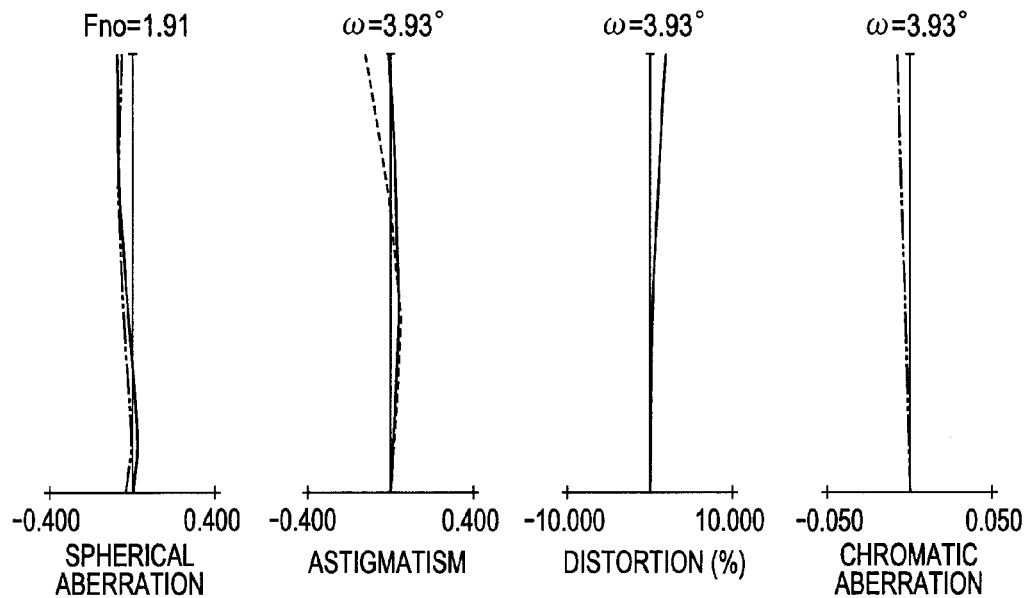
FIG. 6B is an aberration graph in the state in which focus is at infinity at an intermediate zoom position according to Numerical Embodiment 3.
Figure 6C:
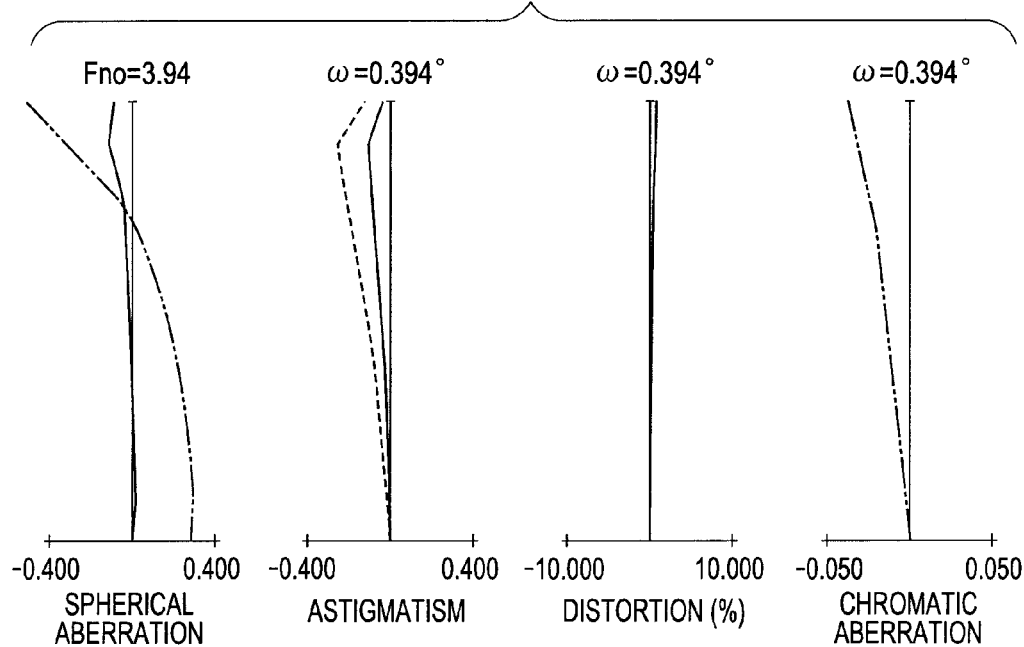
FIG. 6C is an aberration graph in the state in which focus is at infinity at a telephoto end according to Numerical Embodiment 3.

FIG. 5 is a lens cross-sectional view in the state in which an object at infinity is in focus at a wide-angle end (f=8.0 mm) of a zoom lens according to Embodiment 3 (Numerical Embodiment 3) of the present invention. FIGS. 6A, 6B and 6C are aberration graphs in the state in which an object at infinity is in focus at the wide-angle end, at an intermediate zoom position (focal length f=80.00 mm), and at a telephoto end (f=800.00 mm), respectively, according to Numerical Embodiment 3.

Figure 8B:
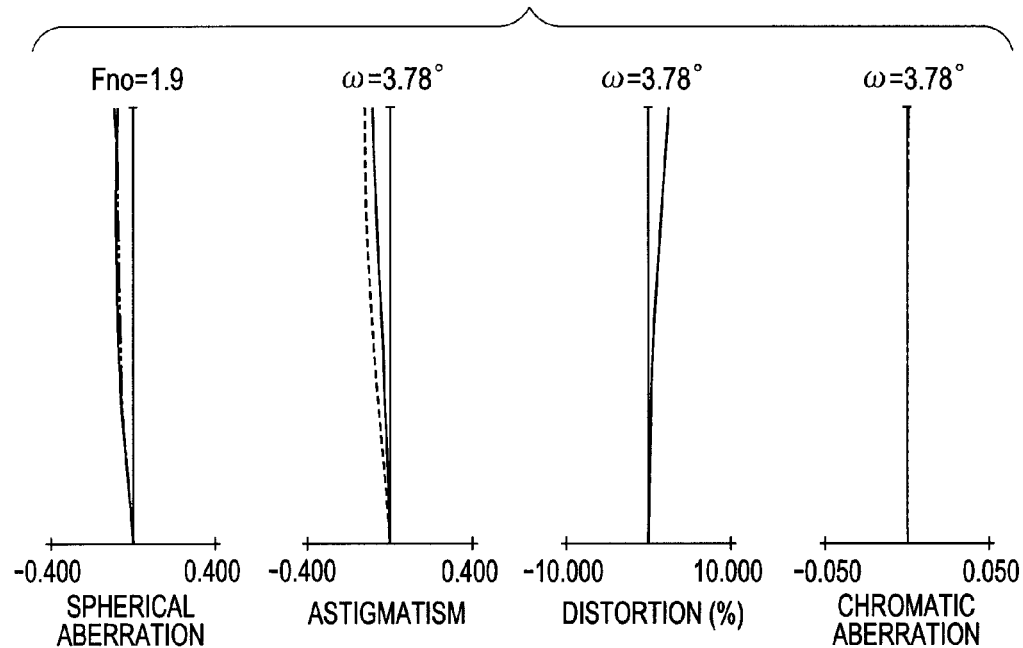
FIG. 8B is an aberration graph in the state in which focus is at infinity at an intermediate zoom position according to Numerical Embodiment 4.
Figure 8C:
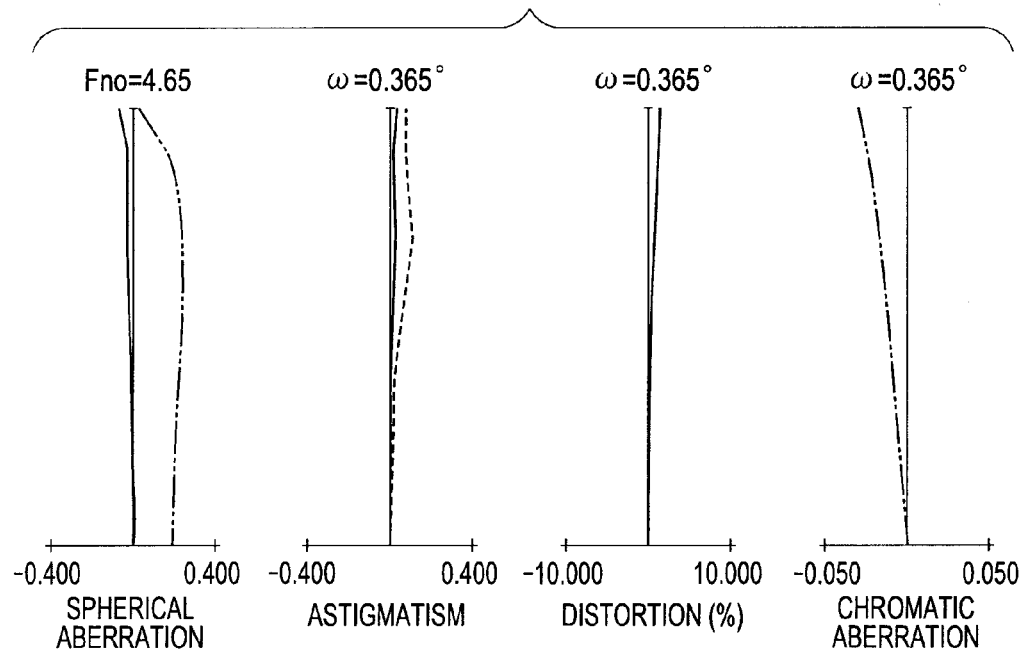
FIG. 8C is an aberration graph in the state in which focus is at infinity at a telephoto end according to Numerical Embodiment 4.

FIG. 7 is a lens cross-sectional view in the state in which an object at infinity is in focus at a wide-angle end (f=8.00 mm) of a zoom lens system according to Embodiment 4 (Numerical Embodiment 4) of the present invention. FIGS. 8A, 8B and 8C are aberration graphs in the state in which an object at infinity is in focus at the wide-angle end, at an intermediate zoom position (focal length f=83.14 mm), and at a telephoto end (f=864.00 mm), respectively, according to Numerical Embodiment 4.

Figure 9:
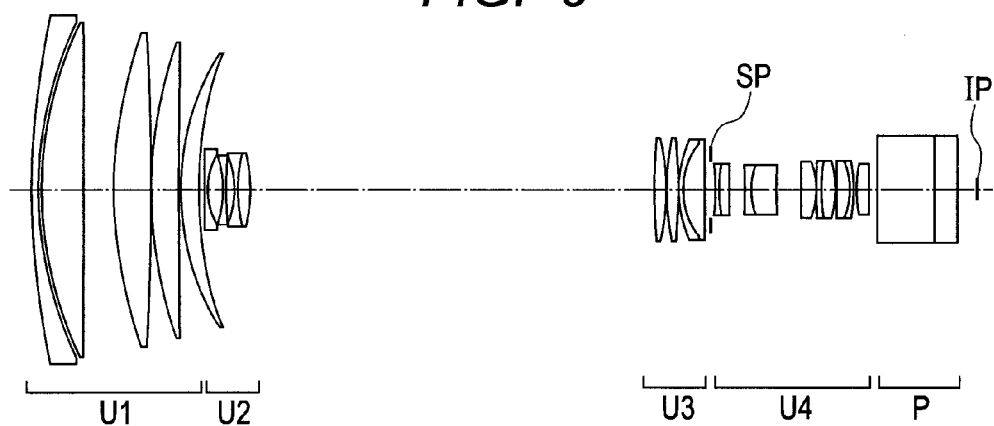
FIG. 9 is a lens cross-sectional view in the state in which focus is at infinity at a wide-angle end according to Numerical Embodiment 5.
Figure 10A:
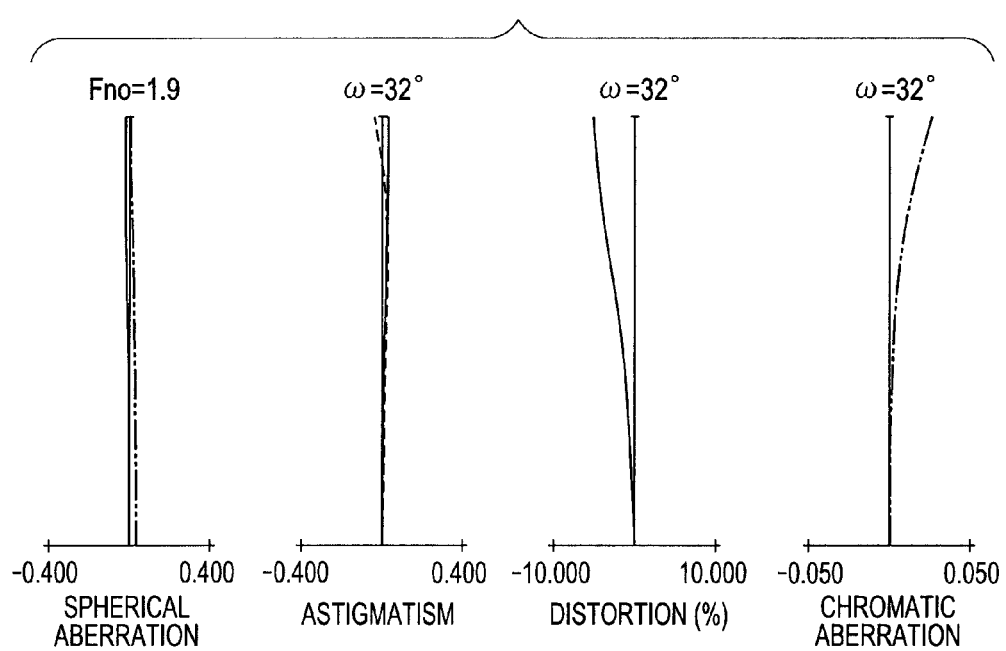
FIG. 10A is an aberration graph in the state in which focus is at infinity at the wide-angle end according to Numerical Embodiment 5.
Figure 10B:
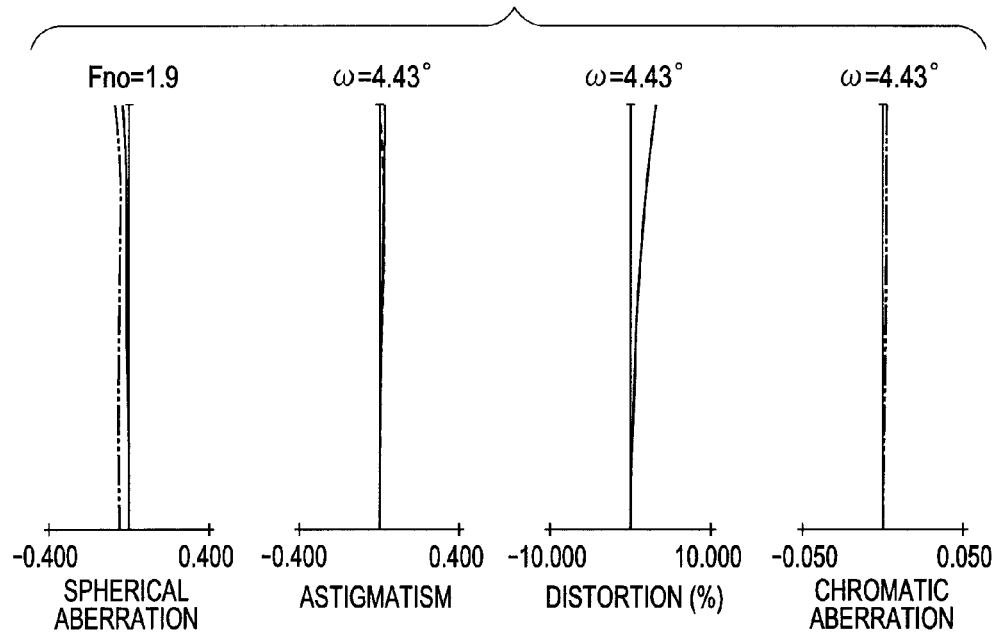
FIG. 10B is an aberration graph in the state in which focus is at infinity at an intermediate zoom position according to Numerical Embodiment 5.
Figure 10C:
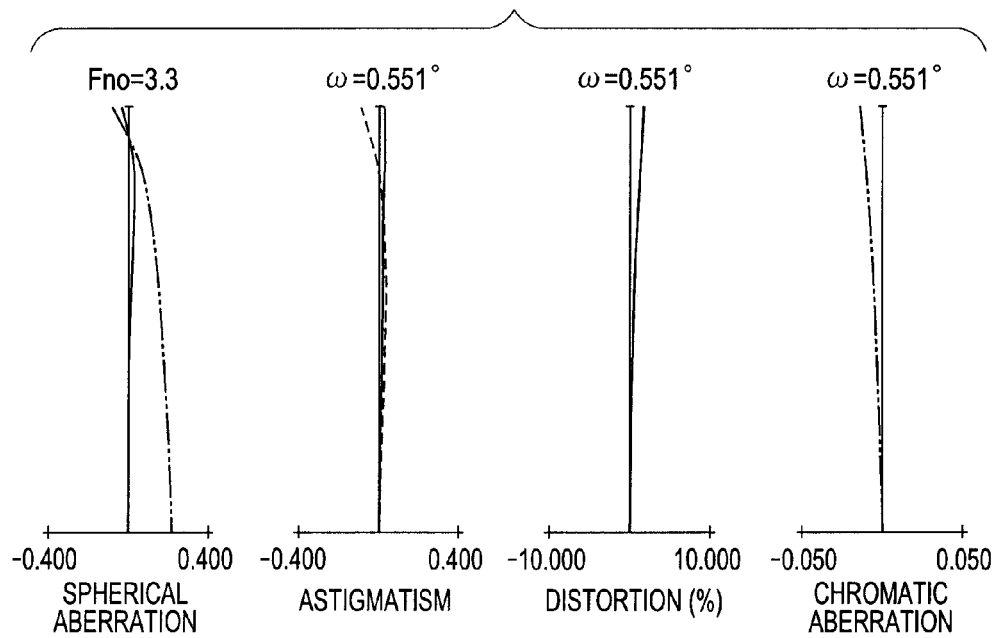
FIG. 10C is an aberration graph in the state in which focus is at infinity at a telephoto end according to Numerical Embodiment 5.

FIG. 9 is a lens cross-sectional view in the state in which an object at infinity is in focus at a wide-angle end (f=8.80 mm) of a zoom lens according to Embodiment 5 (Numerical Embodiment 5) of the present invention. FIGS. 10A, 10B and 10C are aberration graphs in the state in which an object at infinity is in focus at the wide-angle end, at an intermediate zoom position (focal length f=70.95 mm), and at a telephoto end (f=572.00 mm), respectively, according to Numerical Embodiment 5.

Figure 12B:
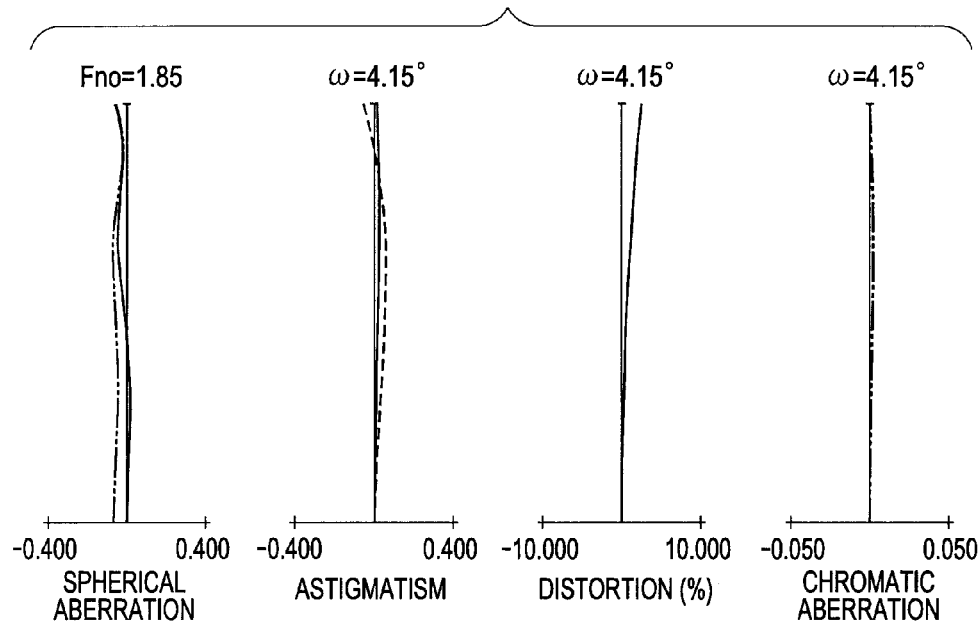
FIG. 12B is an aberration graph in the state in which focus is at infinity at an intermediate zoom position according to Numerical Embodiment 6.
Figure 12C:
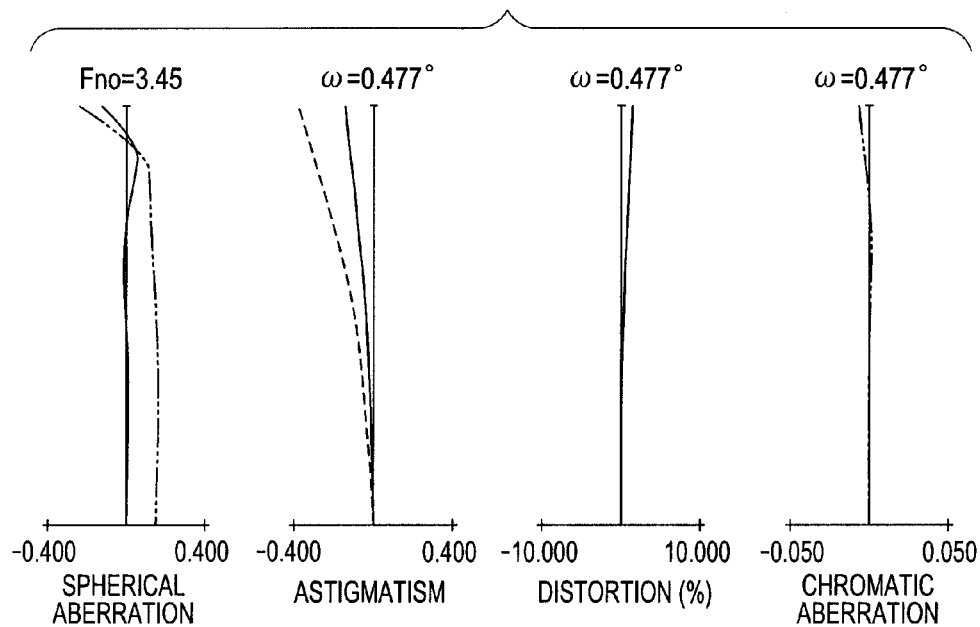
FIG. 12C is an aberration graph in the state in which focus is at infinity at a telephoto end according to Numerical Embodiment 6.

FIG. 11 is a lens cross-sectional view in the state in which an object at infinity is in focus at a wide-angle end (f=8.70 mm) of a zoom lens according to Embodiment 6 (Numerical Embodiment 6) of the present invention. FIGS. 12A, 12B and 12C are aberration graphs in the state in which an object at infinity is in focus at the wide-angle end, at an intermediate zoom position (focal length f=75.84 mm), and at a telephoto end (f=661.20 mm), respectively, according to Numerical Embodiment 6.

In each of the lens cross-sectional views, the left-hand side is the subject (object) side (front side), and the right-hand side is the image side (rear side). In each of the lens cross-sectional views, a first lens unit U1 includes the focusing lens unit and has the positive refractive power. A second lens unit U2 including the magnification-varying lens unit and having the negative refractive power moves monotonously along the optical axis toward the image plane side, to thereby perform the magnification-varying from the wide-angle end to the telephoto end. A third lens unit U3 having the positive refractive power for correcting the image plane variation caused by the magnification-varying moves non-linearly along the optical axis toward the object side, to thereby correct the image plane variation caused by the magnification-varying from the wide-angle end to the telephoto end.

The second lens unit U2 and the third lens unit U3 constitute a magnification-varying system. A stop (aperture stop) SP is also provided. A fourth lens unit U4 having the positive refractive power for imaging does not move for zooming. In each of the lens cross-sectional views, a glass block P is illustrated and is actually a color separation prism, an optical filter, or the like. An image pickup plane IP corresponds to the image pickup plane of a solid-state image pickup element (photoelectric conversion element) which receives light of an image formed by the zoom lens and performs photoelectric conversion.

The zoom lens of each embodiment includes the lens unit (extender) which is insertable into/removable from the optical path and changes the range of the focal length of the entire zoom lens by withdrawing some optical members of the fourth lens unit from the optical path.

The above-mentioned zoom lens of each embodiment employs such zoom type that is suitable to achieve a high-magnification zoom lens with excellent optical performance.

The zoom lens of each embodiment, which includes the second lens unit U2 having the negative refractive power for magnification-varying and the third lens unit U3 having the positive refractive power for correcting image plane variation caused by magnification-varying, employs such zoom type that is called a transition type, thereby achieving a higher magnification with ease.

In each of the longitudinal aberration graphs, spherical aberration is illustrated with respect to e-line (indicated by solid line) and g-line (indicated by chain double-dashed line). Further, astigmatism is illustrated on a meridional image plane (meri) (indicated by dotted line) with respect to e-line and a sagittal image plane (Sagi) (indicated by solid line) with respect to e-line. In addition, lateral chromatic aberration is illustrated with respect to g-line (indicated by chain double-dashed line). An F-number is denoted by Fno and a half angle of field is denoted by ω. In each of the longitudinal aberration graphs, spherical aberration is illustrated in the unit of 0.4 mm, astigmatism in the unit of 0.4 mm, distortion in the unit of 10%, and lateral chromatic aberration in the unit of 0.05 mm. Note that, in each embodiment described below, each of the wide-angle end and the telephoto end refers to a zooming position obtained when the second lens unit U2 for magnification-varying is positioned at each of the ends of a range in which the second lens unit U2 may mechanically move along the optical axis.

In a zoom lens according to a first aspect of the present invention, the second lens unit U2 includes four lenses as a whole, in which the first lens having the negative refractive power and the second lens having the negative refractive power are disposed successively in order from the object side to the image side.

In the first aspect, the following conditional expressions are satisfied:

$$7.8 < f1/|f21| < 12.0 \tag{1a}$$

$$1.20 < f21/f2 < 1.63 \tag{2a}$$

$$0.04 < O12/D2 < 0.15 \tag{3a}$$

where f1 represents the focal length of the first lens unit U1, f2 represents the focal length of the second lens unit U2, f21 represents the focal length of the first lens, O12 represents a distance between a lens surface vertex of the first lens on the object side and an object side principal point position of the second lens unit U2, and D2 represents the thickness of the second lens unit U2 on the optical axis.

Further, in the first aspect, it is preferred that at least one of the following conditional expressions be satisfied.

One of the conditional expressions relates to the thickness D2 on the optical axis of the second lens unit U2 and the focal length f21 of the first lens, and the thickness D2 and the focal length f21 satisfy the following conditional expression:

$$0.55 < D2/|f21| < 0.98 \tag{4a}$$

The other of the conditional expressions relates to a k-lens which is on the most image side in the second lens unit U2 and has a negative refractive power, and a focal length f2k of the k-lens satisfies the following conditional expression:

$$0.95 < f2k/f21 < 3.92 \tag{5a}$$

Hereinafter, technical meanings of the respective conditional expressions given above are described.

The conditional expressions (1a) to (3a) are for achieving a size and weight reduction for the entire lens system, in addition to achieving both a wide angle and a high magnification for the zoom lens. The conditional expressions (1a) to (3a) define a power ratio between the first lens unit U1 and the second lens unit U2 (ratio between the focal length of the first lens unit and the focal length of the second lens unit) and appropriate lens structure for the second lens unit U2.

The conditional expression (1a) defines the ratio between the focal lengths of the first lens unit U1 and the second lens unit U2 which constitute the zoom lens of the first aspect of the present invention. Here, |f2| represents an absolute value of the focal length f2. With the satisfaction of the conditional expression (1a), an appropriate focal length of the first lens unit U1 can be set with respect to the focal length of the second lens unit U2. Thus, it is possible to realize a size and weight reduction efficiently for the entire system, in addition to achieving both a wide angle and a high magnification (high zoom ratio). If f1/|f2| is equal to or greater than the upper limit of the conditional expression (1a), the focal length of the first lens unit U1 becomes long, and hence a size and weight reduction becomes difficult to achieve for the zoom lens. Conversely, if f1/|f2| is equal to or smaller than the lower limit of the conditional expression (1a), aberration correction becomes difficult for the first lens unit U1 on the telephoto side, or in other cases, a high magnification becomes difficult to achieve for the zoom lens due to a lack of power necessary for the magnification-varying of the second lens unit U2.

More preferably, the conditional expression (1a) is set as follows:

$$8.0 < f1/|f2| < 11.0 \tag{1aa}$$

Further, the conditional expression (2a) defines a ratio of the focal length of the first lens, which is on the most object side in the second lens unit U2 and has the negative refractive power, with respect to the focal length of the entire second lens unit U2. With the satisfaction of the conditional expression (2a), the object side principal point position of the second lens unit U2 can be shifted toward the object side effectively, and hence a size and weight reduction becomes easy to achieve for the first lens unit U1. If f21/f2 is equal to or greater than the upper limit of the conditional expression (2a), the principal point position of the second lens unit U2 is not shifted satisfactorily toward the object side, and hence a size and weight reduction becomes difficult to achieve for the zoom lens. Conversely, if f21/f2 is equal to or smaller than the lower limit of the conditional expression (2a), the negative refractive power of the first lens becomes extremely high, and hence a size reduction, a weight reduction, and aberration correction become difficult to achieve for the zoom lens.

More preferably, the conditional expression (2a) is set as follows:

$$1.22 < f21/f2 < 1.62 \quad (2aa)$$

Further, the conditional expression (3a) defines a relation of the object side principal point position of the second lens unit U2 constituting the zoom lens of the present invention, with respect to the thickness of the second lens unit on the optical axis. With the satisfaction of the conditional expression (3a), the object side principal point position of the second lens unit U2 can be shifted toward the object side sufficiently, and hence a wide angle and a size and weight reduction become easy to achieve for the zoom lens. If O12/D2 is equal to or greater than the upper limit of the conditional expression (3a), the object side principal point position of the second lens unit U2 is not shifted toward the object side sufficiently, and hence a wide angle and a size and weight reduction become difficult to achieve for the zoom lens. Conversely, if O12/D2 is equal to or smaller than the lower limit of the conditional expression (3a), the negative refractive power of the first lens becomes excessively high, or in other cases, the thickness of the second lens unit U2 becomes large. Hence, a size and weight reduction and aberration correction become difficult to achieve for the zoom lens.

More preferably, the conditional expression (3a) is set as follows:

$$0.05 < O12/D2 < 0.14 \quad (3aa)$$

Figure 14:
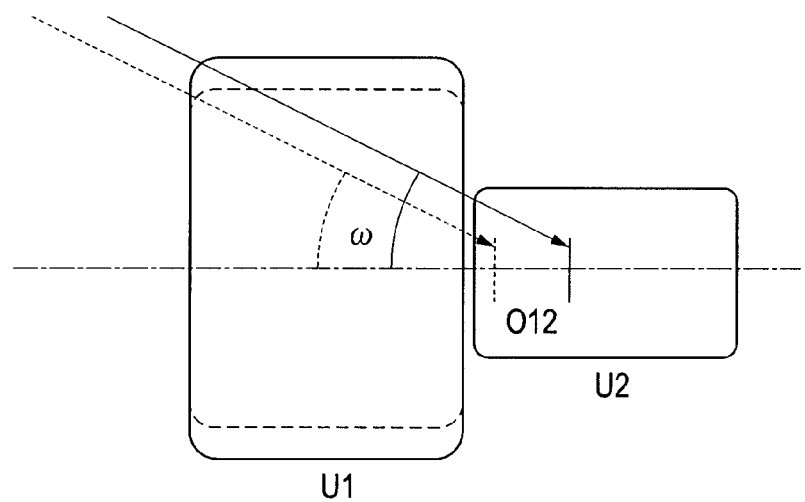
FIG. 14 is an explanatory diagram illustrating a principal point position of a second lens unit of a zoom lens of the present invention.

Here, the effect of shifting the object side principal point position of the second lens unit toward the object side is described with reference to FIG. 14. In FIG. 14, U1 represents the first lens unit U1, U2 represents the second lens unit U2, O12 represents the object side principal point position of the second lens unit U2, and ω represents a half angle of field. Achieving a wide angle for the zoom lens is likely to cause the lens effective diameter on the object side of the first lens unit U1 to be increased. On such an occasion, when the principal point position O12 on the object side of the second lens unit U2 is located at the position indicated by the solid line of FIG. 14, the lens effective diameter of the first lens unit U1 needs to have the size indicated by the solid line.

Then, if the principal point position O12 on the object side of the second lens unit U2 is shifted up to the position indicated by the dotted line of FIG. 14, the same half angle of field ω can be secured with the lens effective diameter indicated by the dotted line of the first lens unit U1. Actually, the lens thickness can also be made smaller along with the reduction in lens diameter, and hence it is further possible to obtain the effect of a size and weight reduction. As described above, by shifting the object side principal point position of the second lens unit U2 toward the object side, a wide angle and a size and weight reduction can be achieved effectively for the zoom lens.

The conditional expression (4a) defines a more optimal thickness of the second lens unit U2 on the optical axis for achieving both a wider angle and a further reduction of size and weight for the zoom lens.

The conditional expression (4a) defines, in the second lens unit U2 constituting the zoom lens of the first aspect of the present invention, a ratio of the thickness of the second lens unit U2 on the optical axis with respect to the focal length of the first lens. Here, |f21| represents an absolute value of the focal length f21. With the satisfaction of the conditional expression (4a), it is possible to set an appropriate balance between the focal length of the first lens and the thickness of the second lens unit U2, and hence a wide angle and a size and weight reduction can be realized efficiently. If D2/f21 is equal to or greater than the upper limit of the conditional expression (4a), the thickness of the second lens unit U2 on the optical axis becomes large, thereby causing the first lens unit U1 to be disposed closer to the object side. Hence, a size and weight reduction becomes difficult to achieve for the zoom lens.

Conversely, if D2/|f21| is equal to or smaller than the lower limit of the conditional expression (4a), the first lens cannot have a sufficient negative refractive power, and hence a wide angle becomes difficult to achieve for the zoom lens.

More preferably, the conditional expression (4a) is set as follows:

$$0.56 < D2/|f21| < 0.95 \quad (4aa)$$

Still more preferably, the conditional expression (4aa) is set as follows:

$$0.57 < D2/|f21| < 0.90 \quad (4aaa)$$

The conditional expression (5a) defines a ratio between the focal length of the first lens, which is on the most object side in the second lens unit and has the negative refractive power, and the focal length of the k-lens, which is the most image side and has the negative refractive power, so as to achieve a wider angle and a further reduction of size and weight for the zoom lens with excellent optical performance.

With the satisfaction of the conditional expression (5a), an appropriate balance can be achieved among the negative refractive powers of the second lens unit U2, and hence it becomes easy to shift the principal point of the second lens unit U2, and to realize a size reduction for the second lens unit U2. If f2k/f21 is equal to or greater than the upper limit of the conditional expression (5a), the negative refractive power of the first lens becomes high, and the curvature of the lens surface becomes large. Hence, a size and weight reduction becomes difficult to achieve for the zoom lens. Conversely, if f2k/f21 is equal to or smaller than the lower limit of the conditional expression (5a), the negative refractive power of the k-lens becomes high, and hence it becomes difficult to shift the principal point of the second lens unit U2 toward the object side, and to achieve a size and weight reduction for the lens system.

More preferably, the conditional expression (5a) is set as follows:

$$1.00 < f2k/f21 < 3.68 \quad (5aa)$$

In a zoom lens according to a second aspect of the present invention, the second lens unit U2 is constituted by five lenses as a whole, in which the first lens having the negative refractive power and the second lens having the negative refractive power are disposed successively in order from the object side to the image side.

In the second aspect, the following conditional expressions are satisfied:

$$8.0 < f1/|f2| < 13.5 \quad (1b)$$

$$0.65 < f2n/f2 < 1.85 \quad (2b)$$

$$0.03 < O12/D2 < 0.18 \quad (3b)$$

where f1 represents the focal length of the first lens unit U1, f2 represents the focal length of the second lens unit U2, f2n represents a combined focal length of the first lens and the second lens, O12 represents the distance between the lens surface vertex of the first lens on the object side and the object side principal point position of the second lens unit U2, and D2 represents the thickness of the second lens unit U2 on the optical axis.

Further, in the second aspect, it is preferred that at least one of the following conditional expressions be satisfied.

One of the conditional expressions relates to the thickness D2 of the second lens unit U2 on the optical axis and the combined focal length f2n of the first lens and the second lens, and the thickness D2 and the combined focal length f2n satisfy the following conditional expression:

$$0.80 < D2/|f2n| < 1.60 \quad (4b)$$

The other of the conditional expressions relates to the k-lens which is on the most image side in the second lens unit U2 and has the negative refractive power, and the focal length f2k of the k-lens satisfies the following conditional expression:

$$2.0 < f2k/f2n < 10.0 \quad (5b)$$

Hereinafter, technical meanings of the respective conditional expressions given above are described.

The conditional expressions (1b) to (3b) define the focal length ratio between the first lens unit U1 and the second lens unit U2, and the focal lengths of the negative lenses included in the second lens unit U2 so as to achieve a size and weight reduction for the entire lens system in addition to achieving both a wide angle and a high magnification for the zoom lens. In the second aspect, the number of constituent lenses of the second lens unit U2 is made larger than that in the first aspect so as to obtain such an aspect that is more advantageous in achieving a wide angler, a higher magnification, and a further reduction of size and weight. When both a high power and a size and weight reduction are to be achieved for the zoom lens, each lens of the second lens unit U2 used mainly for the magnification-varying tends to have a relatively high power.

In view of the above, by increasing the number of constituent lenses of the second lens unit U2, the sensitivity of the aberration of each lens is decreased, thereby achieving a reduction in high-order aberration and performance stability in terms of manufacture, in particular. Particularly, when the high negative refractive power corresponding to the first lens is shared among multiple lenses, advantageous effects are expected in shifting the principal point of the second lens unit U2 toward the object side and in aberration correction.

The technical content of the conditional expression (1b) is the same as that of the conditional expression (1a). Note that, in this aspect, because the increase in number of lenses of the second lens unit U2 gives an advantage in shortening the focal length of the second lens unit U2, the upper limit is shifted to a larger value.

More preferably, the conditional expression (1b) is set as follows:

$$8.2 < f1/|f2| < 11.5 \quad (1bb)$$

The conditional expression (2b) defines a ratio of the combined focal length f2n of the two negative lenses disposed successively on the most object side in the second lens unit U2, with respect to the focal length of the entire second lens unit U2. The technical content of the conditional expression (2b) is the same as that of the conditional expression (2a). Note that, due to the increase in number of constituent lenses of the second lens unit U2, the focal length f2n and the focal length f2 can take values from a wider range, and hence the range between the upper and lower limits is widened.

More preferably, the conditional expression (2b) is set as follows:

$$0.75 < f2n/f2 < 1.4 \quad (2bb)$$

The conditional expression (3b) defines a ratio between the combined focal length of the two negative lenses, which are disposed successively on the most object side in the second lens unit U2, and the focal length of the k-lens, which is disposed on the most image side and has the negative refractive power. The technical content of the conditional expression (3b) is the same as that of the conditional expression (3a). Note that, due to the increase in number of constituent lenses of the second lens unit U2, the distance O12 and the thickness D2 can take values from a wider range, and hence the range between the upper and lower limits is widened.

More preferably, the conditional expression (3b) is set as follows:

$$0.04 < O12/D2 < 0.17 \quad (3bb)$$

The conditional expression (4b) relates to an appropriate thickness of the second lens unit U2 on the optical axis so as to achieve both a wider angle and a further reduction of size and weight for the zoom lens. In the second aspect, the number of constituent lenses of the second lens unit U2 is increased so as to obtain such a mode that is more advantageous in achieving a wider angle, a higher magnification and a further reduction of size and weight. Particularly, when the high negative refractive power corresponding to the first lens is shared by multiple lenses, the curvature of the lens surface of each lens becomes small, and as a result, an effect of suppressing the thickness of the lens can be expected.

The conditional expression (4b) defines, regarding the second lens unit U2 of the zoom lens according to the second aspect of the present invention, a ratio of the thickness of the second lens unit U2 on the optical axis with respect to the combined focal length of the two negative lenses disposed successively on the most object side in the second lens unit U2. Here, |f2n| is an absolute value of the focal length f2n. The technical content of the conditional expression (4b) is the same as that of the conditional expression (4a). Note that, due to the increase in number of constituent lenses of the second lens unit U2, the thickness D2 can be increased, or the focal length f2n can take a smaller value. Hence, the upper limit is shifted to a larger value.

More preferably, the conditional expression (4b) is set as follows:

$$0.85 < D2/|f2n| < 1.45 \quad (4bb)$$

The conditional expression (5b) defines a ratio between the combined focal length of the two lenses, which are disposed successively on the most object side in the second lens unit U2 and have the negative refractive powers, and the focal length of the k-lens, which is on the most image side and has the negative refractive power, so as to achieve a wider angle and a further reduction of size and weight for the zoom lens with excellent optical performance. In the second aspect, the number of constituent lenses of the second lens unit U2 is increased so as to obtain such a mode that is more advantageous in achieving a wider angle, a higher magnification, and a further reduction of size and weight.

The conditional expression (5b) defines, regarding the second lens unit U2 of the zoom lens according to the second aspect of the present invention, the ratio of the focal length of the negative k-lens on the most image side in the second lens unit U2, with respect to the combined focal length of the two negative lenses disposed successively on the most object side in the second lens unit U2. The technical content of the conditional expression (5b) is the same as that of the conditional expression (5a). Note that, due to the increase in number of constituent lenses of the second lens unit U2, the focal length f2k and the focal length f2n can take values from a wider range, and hence the range between the upper and lower limits is widened.

More preferably, the conditional expression (5b) is set as follows:

$$2.3 < f2k/f2n < 9.5 \tag{5bb}$$

In the first aspect and the second aspect of the present invention, it is preferred that at least one of the following conditions be satisfied.

Those conditions include the following conditional expressions:

$$0.8 < (R1+R2)/(R1-R2) < 1.2 \tag{6}$$

$$1.75 < N21 < 2.30 \tag{7}$$

$$18 < \nu21 < 50 \tag{8}$$

where R1 represents a curvature radius of a lens surface of the first lens on the object side, R2 represents a curvature radius of a lens surface of the first lens on the image side, N21 represents a refractive index of a material forming the first lens, and ν21 represents an Abbe number of the material forming the first lens.

In addition, the conditions also include the following conditional expressions:

$$1.7 < N2p < 2.1 \tag{9}$$

$$16 < \nu2p < 30 \tag{10}$$

where N2p represents a refractive power of a material forming a p-lens included in the second lens unit U2 and having a positive refractive power, and ν2p represents an Abbe number of the material forming the p-lens.

The conditional expressions (6) to (8) define an optimal shape and material of the first lens so as to achieve a wider angle, a higher magnification, and a further reduction of size and weight for the zoom lens with excellent optical performance.

The conditional expression (6) defines ideal structure of the first lens for shifting the principal point of the second lens unit U2 constituting the zoom lens of the present invention. With the satisfaction of the conditional expression (6), it becomes easy to provide an appropriate refractive power to the first lens, with the result that both a wide angle and a high magnification are achieved for the zoom lens with excellent optical performance, and further that a size and weight reduction is realized efficiently.

If (R1+R2)/(R1-R2) is equal to or greater than the upper limit of the conditional expression (6), the curvature radius of the lens surface of the first lens on the object side takes a positive and small value, and hence it becomes difficult to provide an appropriate refractive power to the first lens. As a result, a wide angle and a size and weight reduction become difficult to achieve for the zoom lens. Conversely, if (R1+R2)/(R1−R2) is equal to or smaller than the lower limit of the conditional expression (6), the curvature radius of the lens surface of the first lens on the object side takes a negative and small value, and hence more air spacing is required in a peripheral portion of the lens so as to avoid interference with the first lens unit U1. As a result, a size and weight reduction becomes difficult to achieve for the zoom lens. More preferably, the conditional expression (6) is set as follows:

$$1.00 < (R1+R2)/(R1-R2) < 1.17 \tag{6c}$$

The conditional expression (6c) defines a condition for the first lens to have a convex surface on the object side. With the satisfaction of the conditional expression (6c), a mechanism for holding the first lens does not protrude toward the object side beyond the first lens, and the air spacing required to avoid interference with the first lens unit U1 can be minimized. This provides a further advantage for achieving a size and weight reduction for the lens. Further, the satisfaction of the conditional expression (6c) is also effective in preventing an increase in barrel distortion caused by achieving a wide angle for the zoom lens.

In a case where the lens surface of the first lens has an aspherical shape, as the values of R1 and R2 of the conditional expressions (6) and (6c), there may be employed a so-called reference spherical radius, which is obtained by connecting, with an arc, a surface vertex of the lens on the optical axis to the position of the surface at the lens effective diameter.

Further, the conditional expressions (7) and (8) define the refractive index and the Abbe number, respectively, of the material forming the first lens. With the satisfaction of the conditional expression (7), the first lens can be provided with an appropriate refractive power and shape and with an appropriate capability of correcting chromatic aberration, and hence it is possible to realize a wide angle, a high magnification, and a size and weight reduction for the zoom lens with excellent optical performance. If N21 is equal to or greater than the upper limit of the conditional expression (7), it is difficult to acquire such a material that effectively provides an achromatic effect in the second lens unit U2, and hence chromatic aberration correction becomes difficult to perform when a high magnification is achieved for the zoom lens. Conversely, if N21 is equal to or smaller than the lower limit of the conditional expression (7), it becomes difficult to secure an appropriate refractive power for the first lens, and hence a wide angle and a size and weight reduction become difficult to achieve for the zoom lens.

More preferably, the conditional expression (7) is set as follows:

$$1.8 < N21 < 2.2 \tag{7c}$$

If ν21 is equal to or greater than the upper limit of the conditional expression (8), it becomes difficult to provide an appropriate refractive power to the first lens, and hence it becomes difficult to shift the principal point of the second lens unit U2 toward the object side. Conversely, if ν21 is equal to or smaller than the lower limit of the conditional expression (8), the curvature of the lens surface for chromatic aberration correction becomes large, and hence a size and weight reduction becomes difficult to achieve. More preferably, the conditional expression (8) is set as follows:

$$23 < \nu21 < 45 \tag{8c}$$

The conditional expressions (9) and (10) relate to an optimal material of the p-lens, which is included in the second lens unit U2 and has the positive refractive power, so as to achieve a wider angle, a higher power and a further reduction of size and weight for the zoom lens with excellent optical performance. Note that, in a case where the second lens unit U2 includes multiple lenses having a positive refractive power, one or both of the lenses are treated as the p-lens.

The conditional expressions (9) and (10) define, regarding the second lens unit U2 constituting the zoom lens of the present invention, the refractive index and the Abbe number, respectively, of the material forming the p-lens. With the satisfaction of the conditional expressions (9) and (10), the refractive power, the shape, and the capability of correcting chromatic aberration can be set appropriately for the p-lens, and hence it is possible to efficiently achieve both a wide angle and a high magnification, and also a size and weight reduction.

If N2p is equal to or greater than the upper limit of the conditional expression (9), the refractive power of the p-lens becomes high, and, in order to maintain an appropriate negative refractive power for the second lens unit U2, the refractive power of the negative lens also becomes high, with the result that the curvature of the lens surface becomes large. Hence, a size reduction becomes difficult to achieve for the lens system. Conversely, if N2p is equal to or smaller than the lower limit of the conditional expression (9), it becomes difficult to provide the p-lens with both an appropriate refractive power and an appropriate capability of chromatic correction, and hence a high magnification and a size and weight reduction become difficult to achieve for the lens system.

More preferably, the conditional expression (9) is set as follows:

$$1.75 < N2p < 2.00 \tag{9c}$$

If ν2p is equal to or greater than the upper limit of the conditional expression (10), it becomes difficult to provide a sufficient capability of chromatic correction to the p-lens, and hence a wide angle and a size and weight reduction become difficult to achieve.

Conversely, if ν2p is equal to or smaller than the lower limit of the conditional expression (10), the curvature of the lens surface becomes large in order to gain an achromatic effect, and hence a size and weight reduction becomes difficult to achieve.

More preferably, the conditional expression (10) is set as follows:

$$17 < \nu 2p < 27 \tag{10c}$$

An image pickup apparatus of the present invention includes the zoom lens of each embodiment and the solid-state image pickup element which has a predetermined effective image pickup range for receiving light of an image formed by the zoom lens.

In this case, the following conditional expressions are preferably satisfied:

$$60 < ft/fw < 115 \tag{11}$$

$$62.9 < \omega w < 70.0 \tag{12}$$

where ωw represents an angle of field of the zoom lens at the wide-angle end, fw represents the focal length of the entire system at the wide-angle end, and ft represents the focal length of the entire system at the telephoto end.

The conditional expressions (11) and (12) define a range of a magnification of the zoom lens and a range of the angle of field thereof at the wide-angle end, respectively, which are suitable for providing the effects obtained by the present invention.

If the conditional expressions (11) and (12) are not satisfied, a high zoom ratio and a wide angle of field become difficult to achieve.

Hereinafter, specific lens structure of each embodiment is described.

Embodiment 1

In the zoom lens of Embodiment 1 illustrated in FIG. 1, the second lens unit U2 corresponds to an 11th surface to a 17th surface in Numerical Embodiment 1. The second lens unit U2 includes four lenses made of a glass material. The second lens unit U2 includes in order from the object side to the image side: a negative meniscus lens G21 having a convex surface on the object side; a cemented lens obtained by cementing a biconcave negative lens G22 and a biconvex positive lens G23; and a negative meniscus lens G24 having a convex surface on the image side. The lens surface of the negative lens G21 on the object side has an aspherical shape. The surface of the negative lens G21 on the object side has a convex shape, which is an advantageous shape in achieving a size and weight reduction for the lens system. Further, the surface of the negative lens G24 on the image side has a convex shape, which is advantageous in achieving a size and weight reduction for the lens system. Further, in this embodiment, although the negative lens G22 and the positive lens G23 are cemented together, the negative lens G22 and the positive lens G23 may be separated instead of being cemented as long as the second lens unit U2 has an appropriate refractive power and an appropriate capability of correcting chromatic aberration. Such structure is within the scope of conceivable alterations and modifications in the lens shape according to the present invention, and the same applies to all embodiments described below.

Embodiment 2

In a zoom lens of Embodiment 2 illustrated in FIG. 3, the second lens unit U2 corresponds to an 11th surface to a 17th surface in Numerical Embodiment 2. The second lens unit U2 includes four lenses made of a glass material. The second lens unit U2 includes in order from the object side to the image side: a negative meniscus lens G21 having a convex surface on the object side; a biconcave negative lens G22; and a cemented lens obtained by cementing a positive lens G23 and a negative meniscus lens G24 having a convex surface on the image side. The surface of the negative lens G21 on the object side has an aspherical shape. The surface of the negative lens G21 on the object side has a convex shape, which is an advantageous shape in achieving a size and weight reduction for the lens system. Further, the surface of the negative lens G24 on the image side has a convex shape, which is an advantageous shape in achieving a size and weight reduction for the lens system.

Embodiment 3

In a zoom lens of Embodiment 3 illustrated in FIG. 5, the second lens unit U2 corresponds to an 11th surface to a 17th surface in Numerical Embodiment 3. The second lens unit U2 includes four lenses made of a glass material. The second lens unit U2 includes in order from the object side to the image side: a negative meniscus lens G21 having a convex surface on the object side; a cemented lens obtained by cementing a biconcave negative lens G22 and a biconvex positive lens G23; and a negative meniscus lens G24 having a convex surface on the image side. The surface of the negative lens G21 on the object side has an aspherical shape. The surface of the negative lens G21 on the object side has a convex shape, which is an advantageous shape in achieving a size and weight reduction for the lens system. Further, the surface of the negative lens G24 on the image side has a convex shape, which is an advantageous shape in achieving a size and weight reduction for the lens system.

Embodiment 4

In a zoom lens of Embodiment 4 illustrated in FIG. 7, the second lens unit U2 corresponds to an 11th surface to a 19th surface in Numerical Embodiment 4. The second lens unit U2 includes five lenses made of a glass material. The second lens unit U2 includes in order from the object side to the image side: a negative meniscus lens G21 having a convex surface on the object side; a biconcave negative lens G22; a cemented lens obtained by cementing a biconcave negative lens G23 and a biconvex positive lens G24; and a negative meniscus lens G25 having a convex surface on the image side. The surface of the negative lens G21 on the object side has an aspherical shape. The surface of the negative lens G21 on the object side has a convex shape, which is an advantageous shape in achieving a size and weight reduction for the lens system. Further, the surface of the negative lens G25 on the image side has a convex shape, which is an advantageous shape in achieving a size and weight reduction for the lens system.

In Embodiment 4, in comparison to Embodiments 1 to 3, the second lens unit U2 includes more lenses having a negative refractive power disposed in the object side, thereby achieving a shift of the principal point of the second lens unit U2 and an improvement in degree of freedom for aberration correction. In addition, the refractive power is distributed between the two negative lenses on the object side to reduce the curvatures of the lens surfaces, thereby appropriately preventing the second lens unit U2 from increasing in thickness in the optical axis direction due to the increase in number of the lenses.

Embodiment 5

In a zoom lens of Embodiment 5 illustrated in FIG. 9, the second lens unit U2 corresponds to an 11th surface to a 17th surface in Numerical Embodiment 5. The second lens unit U2 includes four lenses made of a glass material. The second lens unit U2 includes in order from the object side to the image side: a negative meniscus lens G21 having a convex surface on the object side; a negative lens G22 having a concave surface on the object side; and a cemented lens obtained by cementing a biconcave negative lens G23 and a biconvex positive lens G24. The surface of the negative lens G21 on the object side has a convex shape, which is an advantageous shape in achieving a size and weight reduction for the lens system. Further, the surface of the positive lens G24 on the image side has a convex shape, which is an advantageous shape in achieving a size and weight reduction for the lens system.

In Embodiment 5, an aspherical surface is not used in the second lens unit U2, but the three lenses of the second lens unit U2 which have the negative refractive powers are disposed successively on the object side, thereby achieving a shift of the principal point of the second lens unit U2 toward the object side and a size and weight reduction for the zoom lens, and further preventing occurrence of barrel distortion.

Meanwhile, in Embodiment 5, the positive lens G24 having the positive refractive power is disposed on the most image side in the second lens unit U2. In general, in order to achieve both a high magnification and a size and weight reduction for the zoom lens, it is effective to dispose a lens having a negative refractive power on the image side of the second lens unit U2 as well, and to shift the image side principal point position of the second lens unit U2 toward the image side further. In the case of such a zoom ratio that is employed in Embodiment 5, even when a shift of the image side principal point position of the second lens unit U2 is relatively small, desired optical performance can be obtained.

Further, the negative lens G23 and the positive lens G24 are provided with a high power to serve to correct chromatic aberration, resulting in excellent optical performance. As described above, the lens structure of the second lens unit U2 is appropriately set in this embodiment.

Embodiment 6

In a zoom lens of Embodiment 6 illustrated in FIG. 11, the second lens unit U2 corresponds to an 11th surface to an 18th surface in Numerical Embodiment 6. The second lens unit U2 includes five lenses made of a glass material. The second lens unit U2 includes in order from the object side to the image side: a negative meniscus lens G21 having a convex surface on the object side; a cemented lens obtained by cementing a biconcave negative lens G22 and a positive lens G23; and a cemented lens obtained by cementing a biconvex positive lens G24 and a negative lens G25. The negative lens G21 has a concave surface on the image side, which is an advantageous shape in achieving a size and weight reduction for the lens system.

In Embodiment 6, an aspherical surface is not used in the second lens unit U2, but the two lenses of the second lens unit U2 which have the negative refractive powers are disposed successively on the object side, thereby achieving a shift of the principal point of the second lens unit U2 toward the object side and a size and weight reduction for the zoom lens. Further, the occurrence of barrel distortion is also appropriately prevented.

Figure 13:
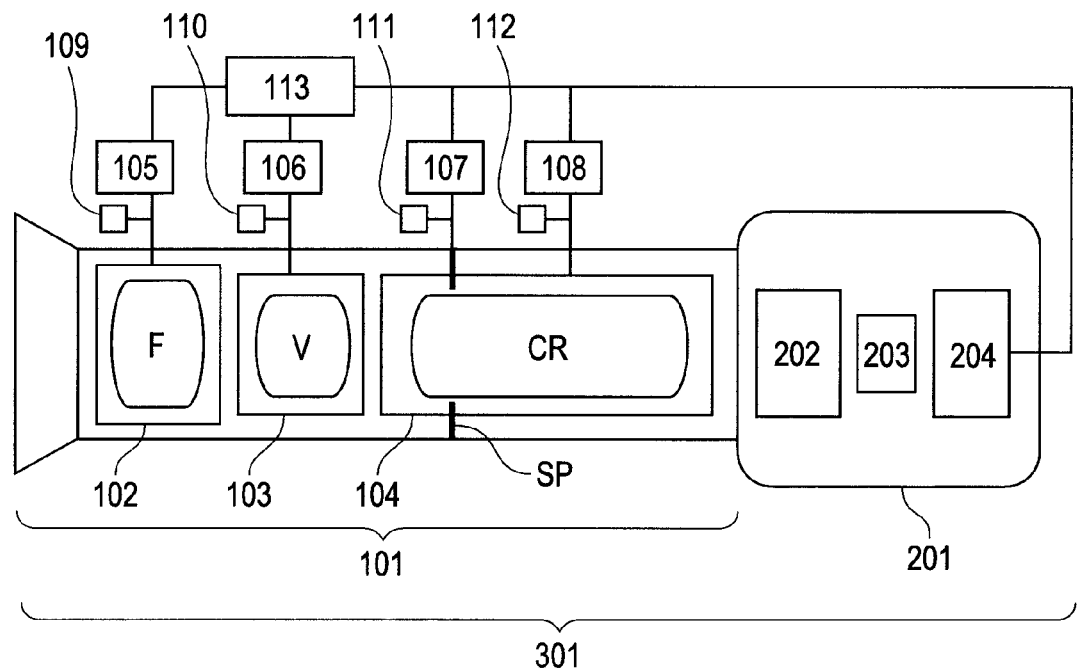
FIG. 13 is a schematic diagram of a main part of an image pickup apparatus of the present invention.

FIG. 13 is a schematic diagram of an image pickup apparatus (TV camera system) employing the zoom lens of each embodiment as an imaging optical system. FIG. 13 illustrates a zoom lens 101 according to any one of Embodiments 1 to 6 and a camera 201. The zoom lens 101 can be mounted into/removed from the camera 201. The zoom lens 101 is mounted into the camera 201 to form an image pickup apparatus 301. The zoom lens 101 includes a first lens unit F, a second lens unit V, and a lens unit CR subsequent to the second lens unit V. The first lens unit F includes a focusing lens unit. The second lens unit V moves along the optical axis for magnification-varying.

The lens unit CR subsequent to the second lens unit includes a lens unit which moves along the optical axis for correcting image plane variation caused by magnification-varying, and a lens unit for imaging. Further, the lens unit CR may include a lens unit (extender) which is insertable into/removable from the optical path and changes the focal length of the entire zoom lens. The zoom lens 101 also includes an aperture stop SP and driving mechanisms 102 to 104, such as helicoids and cams, for driving in the optical axis direction the first lens unit F, the second lens unit V, and the lens unit for correcting image plane variation caused by magnification-varying, respectively. Here, the image pickup apparatus 301 also includes motors (driving means) 105 to 108 for electrically driving the driving mechanisms 102 to 104 and the aperture stop SP.

The image pickup apparatus 301 also includes detectors 109 to 112, such as an encoder, a potentiometer, or a photosensor, which are configured to detect the positions of the first lens unit F, the second lens unit V, and the lens unit for correcting image plane variation caused by magnification-varying on the optical axis, and the aperture diameter of the aperture stop SP. In addition, the camera 201 includes a glass block 202, which corresponds to an optical filter or a color separation prism. Further, the camera 201 includes a solid-state image pickup element (photoelectric conversion element) 203, such as a charge-coupled device (CCD) sensor or a complementary metal-oxide semiconductor (CMOS) sensor. The solid-state image pickup element 203 is configured to receive a subject image formed by the zoom lens 101. Further, central processing units (CPUs) 204 and 113 control various types of driving of the camera 201 and the zoom lens 101, respectively.

By applying the zoom lens according to each embodiment of the present invention to a TV camera as described above, an image pickup apparatus having high optical performance is implemented. Note that, the structure of the zoom lens and the camera regarding the present invention is not limited to the embodiment of FIG. 13, and various alterations and modifications may be made without departing from the gist of the present invention.

Hereinafter, Numerical Embodiments 1 to 6, corresponding to Embodiments 1 to 6 of the present invention, are described. In each of the numerical embodiments, "i" denotes an order of a surface from the object side, "ri" denotes a curvature radius of an i-th surface from the object side, "di" denotes an interval between the i-th surface and the (i+1)-th surface from the object side, and "ndi" and "vdi" respectively denote a refractive index and an Abbe number of the i-th optical member. "BF" denotes an air-equivalent back focus. Three surfaces on the most image side are a glass block, such as a filter.

The aspherical shape is expressed in the following expression where an X axis corresponds to the optical axis, an H axis corresponds to an axis perpendicular to the optical axis, a traveling direction of light corresponds to a positive direction, "R" denotes a paraxial curvature radius, "k" denotes a conic coefficient, and "A4", "A6", "A8", "A10", "A12", "A3", "A5", "A7", "A9", and "A11" each denote an aspherical coefficient. Further, "e-Z" denotes "×10$^{-Z}$".

$$X = \frac{H^2/R}{1+\sqrt{1-(1+k)(H/R)^2}} + A4H^4 + A6H^6 + A8H^8 +$$
$$A10H^{10} + A12H^{12} + A3H^3 + A5H^5 + A7H^7 + A9H^9 + A11H^{11}$$

Further, Table 1 shows numerical values corresponding to the respective conditional expressions in each numerical embodiment.

Numerical Embodiment 1
Unit mm

Surface Data

| Surface Number | r | d | nd | vd | Effective diameter |
|---|---|---|---|---|---|
| 1 | 8321.692 | 4.00 | 1.83400 | 37.2 | 216.72 |
| 2 | 328.643 | 2.11 | | | 208.62 |
| 3 | 325.233 | 29.04 | 1.43387 | 95.1 | 208.25 |
| 4 | −678.870 | 24.86 | | | 207.06 |
| 5 | 411.484 | 19.90 | 1.43387 | 95.1 | 197.32 |
| 6 | −828.584 | 0.25 | | | 197.16 |
| 7 | 231.217 | 21.18 | 1.43387 | 95.1 | 191.18 |

-continued

Numerical Embodiment 1
Unit mm

| 8 | 3063.853 | 1.00 | | | 190.35 |
|---|---|---|---|---|---|
| 9 | 151.518 | 13.75 | 1.49700 | 81.5 | 174.35 |
| 10 | 248.208 | (Variable) | | | 172.92 |
| 11* | 3032.376 | 2.00 | 2.00330 | 28.3 | 46.11 |
| 12 | 33.325 | 12.32 | | | 38.86 |
| 13 | −38.274 | 1.30 | 1.65412 | 39.7 | 38.45 |
| 14 | 67.706 | 10.52 | 1.92286 | 18.9 | 43.26 |
| 15 | −67.037 | 0.82 | | | 44.67 |
| 16 | −59.406 | 1.40 | 1.81600 | 46.6 | 44.73 |
| 17 | −150.846 | (Variable) | | | 46.64 |
| 18 | 113.851 | 8.91 | 1.60300 | 65.4 | 71.69 |
| 19* | −1908.208 | 0.20 | | | 71.96 |
| 20 | 120.352 | 8.57 | 0.00000 | 67.0 | 72.80 |
| 21 | −711.024 | 0.20 | | | 72.50 |
| 22 | 66.079 | 2.50 | 1.84666 | 23.8 | 69.15 |
| 23 | 40.814 | 18.96 | 1.43875 | 94.9 | 63.54 |
| 24 | −557.348 | 0.20 | | | 62.66 |
| 25 | 346.891 | 5.34 | 1.60300 | 65.4 | 61.45 |
| 26* | 1016.391 | (Variable) | | | 59.61 |
| 27 | ∞ | 2.79 | | | 29.15 |
| 28 | −74.821 | 1.40 | 1.88300 | 40.8 | 28.37 |
| 29 | 21.138 | 8.83 | 1.80809 | 22.8 | 27.65 |
| 30 | −143.956 | 3.36 | | | 27.57 |
| 31 | 127.134 | 2.00 | 1.88300 | 40.8 | 33.20 |
| 32 | 75.273 | 9.06 | | | 33.30 |
| 33 | −24.852 | 2.00 | 1.64769 | 33.8 | 25.72 |
| 34 | 38.269 | 10.52 | 1.62041 | 60.3 | 29.21 |
| 35 | −27.335 | 0.20 | | | 30.51 |
| 36 | 663.559 | 13.24 | 1.62041 | 60.3 | 30.02 |
| 37 | 78.625 | 6.62 | | | 28.92 |
| 38 | 382.567 | 7.51 | 1.54072 | 47.2 | 29.52 |
| 39 | −39.376 | 1.20 | | | 29.71 |
| 40 | −689.728 | 2.50 | 1.83400 | 37.2 | 28.12 |
| 41 | 34.583 | 7.55 | 1.51823 | 58.9 | 27.07 |
| 42 | −167.592 | 1.80 | | | 26.81 |
| 43 | −329.999 | 7.82 | 1.53172 | 48.8 | 26.45 |
| 44 | −24.107 | 2.50 | 1.88300 | 40.8 | 26.08 |
| 45 | −69.426 | 1.20 | | | 26.91 |
| 46 | 45.051 | 7.88 | 1.51823 | 58.9 | 26.76 |
| 47 | −70.992 | 10.00 | | | 25.68 |
| 48 | ∞ | 33.00 | 1.60859 | 46.4 | 60.00 |
| 49 | ∞ | 13.20 | 1.51633 | 64.2 | 60.00 |
| 50 | ∞ | (Variable) | | | 60.00 |
| Image plane | ∞ | | | | |

Aspherical surface data

Eleventh surface

K = −1.60352e+005   A4 = 1.56351e−006   A6 = 5.71739e−010
A8 = −1.05160e−012  A10 = −1.42809e−015 A12 = 4.74653e−018
A3 = 1.02711e−006   A5 = −3.22745e−008  A7 = −3.98465e−011
A9 = 1.91483e−013   A11 = −2.43288e−016

Nineteenth surface

K = 2.14909e+003    A4 = −1.65390e−007  A6 = 1.89362e−010
A8 = 3.73102e−013   A10 = −9.03488e−017 A12 = −3.26994e−020
A3 = −1.02630e−006  A5 = 4.50600e−010   A7 = −1.06309e−011
A9 = −3.12794e−015  A11 = 3.12228e−018

Twenty-sixth surface

K = 1.03243e+003    A4 = 4.07277e−007   A6 = −4.92139e−010
A8 = 1.20206e−012   A10 = 9.05775e−016  A12 = −2.41966e−019
A3 = 2.81599e−006   A5 = 2.67896e−008   A7 = −4.90132e−011
A9 = −5.42864e−015  A11 = −2.39409e−017

Various data
Zoom ratio 85.00

| | Wide angle | Intermediate | Telephoto |
|---|---|---|---|
| Focal length | 8.30 | 76.52 | 705.50 |
| F-number | 0.00 | 0.00 | 0.00 |
| Angle of field | 0.00 | 0.00 | 0.00 |
| Image height | 5.50 | 5.50 | 5.50 |
| Total lens length | 611.20 | 611.20 | 611.20 |
| BF | 4.99 | 4.99 | 4.99 |

Numerical Embodiment 1
Unit mm

| | | | |
|---|---|---|---|
| d10 | 2.57 | 134.35 | 170.95 |
| d17 | 255.11 | 97.35 | 1.22 |
| d26 | 3.00 | 28.98 | 88.52 |
| d50 | 4.99 | 4.99 | 4.99 |
| Entrance pupil position | 125.55 | 878.56 | 8993.99 |
| Exit pupil position | 158.81 | 158.81 | 158.81 |
| Front principal point position | 134.30 | 993.15 | 12935.37 |
| Rear principal point position | −3.31 | −71.53 | −700.51 |

Zoom lens unit data

| Unit | Leading surface | Focal length | Lens structure length | Front principal point position | Rear principal point position |
|---|---|---|---|---|---|
| 1 | 1 | 229.60 | 116.09 | 67.05 | −17.62 |
| 2 | 11 | −26.00 | 28.36 | 2.30 | −18.94 |
| 3 | 18 | 65.00 | 44.88 | 6.84 | −23.37 |
| 4 | 27 | 38.46 | 156.19 | 53.87 | 3.13 |

Single lens data

| Lens | Leading surface | Focal length |
|---|---|---|
| 1 | 1 | −407.75 |
| 2 | 3 | 510.01 |
| 3 | 5 | 635.20 |
| 4 | 7 | 573.67 |
| 5 | 9 | 745.07 |
| 6 | 11 | −33.32 |
| 7 | 13 | −36.98 |
| 8 | 14 | 37.47 |
| 9 | 16 | −120.32 |
| 10 | 18 | 177.83 |
| 11 | 20 | 173.91 |
| 12 | 22 | −130.81 |
| 13 | 23 | 87.30 |
| 14 | 25 | 867.56 |
| 15 | 28 | −18.43 |
| 16 | 29 | 23.13 |
| 17 | 31 | −211.60 |
| 18 | 33 | −22.82 |
| 19 | 34 | 27.28 |
| 20 | 36 | −144.45 |
| 21 | 38 | 66.11 |
| 22 | 40 | −39.17 |
| 23 | 41 | 55.81 |
| 24 | 43 | 48.24 |
| 25 | 44 | −42.69 |
| 26 | 46 | 54.23 |
| 27 | 48 | 0.00 |
| 28 | 49 | 0.00 |

Numerical Embodiment 2
Unit mm
Surface Data

| Surface Number | r | d | nd | vd | Effective diameter |
|---|---|---|---|---|---|
| 1 | 8725.458 | 4.00 | 1.83400 | 37.2 | 211.72 |
| 2 | 353.432 | 2.86 | | | 204.85 |
| 3 | 366.055 | 27.68 | 1.43387 | 95.1 | 204.50 |
| 4 | −539.116 | 26.28 | | | 203.53 |
| 5 | 335.764 | 15.93 | 1.43387 | 95.1 | 189.61 |
| 6 | 30774.172 | 0.25 | | | 188.36 |
| 7 | 260.856 | 18.86 | 1.43387 | 95.1 | 183.21 |
| 8 | 16385.100 | 1.20 | | | 182.32 |
| 9 | 181.589 | 13.05 | 1.49700 | 81.5 | 170.85 |
| 10 | 333.937 | (Variable) | | | 169.07 |
| 11* | 3638.747 | 2.18 | 2.00330 | 28.3 | 46.55 |
| 12 | 43.470 | 9.65 | | | 40.52 |
| 13 | −56.118 | 1.40 | 1.88300 | 40.8 | 39.85 |
| 14 | 93.948 | 2.36 | | | 40.11 |
| 15 | 107.577 | 9.10 | 1.92286 | 18.9 | 41.16 |
| 16 | −52.855 | 1.60 | 1.83400 | 37.2 | 41.30 |
| 17 | −588.852 | (Variable) | | | 42.19 |
| 18 | 132.851 | 11.77 | 0.00000 | 67.0 | 73.05 |
| 19* | −152.866 | 0.50 | | | 73.36 |
| 20 | 92.753 | 7.39 | 1.49700 | 81.5 | 72.59 |
| 21 | 233.923 | 0.20 | | | 71.72 |
| 22 | 84.980 | 2.50 | 1.84666 | 23.8 | 70.10 |
| 23 | 48.795 | 16.75 | 1.43875 | 94.9 | 65.66 |
| 24 | −668.529 | 0.20 | | | 64.76 |
| 25 | 346.891 | 5.60 | 0.00000 | 67.0 | 63.67 |
| 26* | −1134.938 | (Variable) | | | 62.29 |
| 27 (Stop) | ∞ | 2.79 | | | 30.71 |
| 28 | −104.880 | 1.40 | 1.88300 | 40.8 | 29.74 |
| 29 | 20.531 | 9.83 | 1.80809 | 22.8 | 28.53 |
| 30 | −207.877 | 1.36 | | | 28.24 |
| 31 | 141.254 | 2.25 | 1.88300 | 40.8 | 27.58 |
| 32 | 65.464 | 9.06 | | | 26.90 |
| 33 | −25.736 | 2.00 | 1.64769 | 33.8 | 26.65 |
| 34 | 35.060 | 10.52 | 1.62041 | 60.3 | 30.54 |
| 35 | −35.887 | 0.20 | | | 32.01 |
| 36 | −121.168 | 14.26 | 1.62041 | 60.3 | 32.39 |
| 37 | −65.117 | 6.62 | | | 34.79 |
| 38 | 222.077 | 7.51 | 1.54072 | 47.2 | 34.38 |
| 39 | −48.394 | 2.00 | | | 34.08 |
| 40 | −169.610 | 2.50 | 1.83400 | 37.2 | 31.51 |
| 41 | 35.270 | 7.53 | 1.51823 | 58.9 | 30.06 |
| 42 | −84.008 | 2.20 | | | 29.85 |
| 43 | −146.346 | 7.79 | 1.53172 | 48.8 | 28.99 |
| 44 | −35.008 | 2.50 | 1.88300 | 40.8 | 28.29 |
| 45 | −58.746 | 1.70 | | | 28.53 |
| 46 | 60.574 | 7.89 | 1.51823 | 58.9 | 26.86 |
| 47 | 581.417 | 10.00 | | | 24.41 |
| 48 | ∞ | 33.00 | 1.60859 | 46.4 | 60.00 |
| 49 | ∞ | 13.20 | 1.51633 | 64.2 | 60.00 |
| 50 | ∞ | (Variable) | | | 60.00 |
| Image plane | ∞ | | | | |

Aspherical surface data

Eleventh surface

K = −1.60352e+005  A4 = 9.47690e−007  A6 = 1.42674e−009
A8 = 1.94869e−012  A10 = 5.73849e−015  A12 = 4.28213e−018
A3 = 7.37680e−008  A5 = −1.88560e−008  A7 = −1.24372e−010
A9 = 5.11701e−014  A11 = −3.52020e−016

Nineteenth surface

K = −1.20252e+001  A4 = −2.48078e−007  A6 = 1.47916e−010
A8 = 1.36508e−013  A10 = 4.10905e−019  A12 = −1.73629e−020
A3 = −7.22996e−007  A5 = −3.29384e−009  A7 = −4.56618e−012
A9 = −1.14056e−015  A11 = 5.95557e−019

Twenty-sixth surface

K = 1.03243e+003  A4 = 2.20550e−007  A6 = −8.70354e−011
A8 = 7.49736e−013  A10 = −2.57232e−016  A12 = 7.26233e−021
A3 = 7.68010e−007  A5 = 8.68126e−009  A7 = −7.33380e−012
A9 = −2.02833e−014  A11 = 1.22287e−017

Various data
Zoom ratio 92.00

| | Wide angle | Intermediate | Telephoto |
|---|---|---|---|
| Focal length | 8.50 | 81.53 | 782.00 |
| F-number | 0.00 | 0.00 | 0.00 |
| Angle of field | 0.00 | 0.00 | 0.00 |
| Image height | 5.50 | 5.50 | 5.50 |

Numerical Embodiment 2
Unit mm

| | | | |
|---|---|---|---|
| Total lens length | 623.58 | 623.58 | 623.58 |
| BF | 5.00 | 5.00 | 5.00 |
| d10 | 2.46 | 147.52 | 187.24 |
| d17 | 273.70 | 102.61 | 2.01 |
| d26 | 3.00 | 29.03 | 89.91 |
| d50 | 5.00 | 5.00 | 5.00 |
| Entrance pupil position | 123.29 | 926.41 | 9069.85 |
| Exit pupil position | 367.56 | 367.56 | 367.56 |
| Front principal point position | 131.99 | 1026.27 | 11538.55 |
| Rear principal point position | −3.50 | −76.53 | −777.00 |

Zoom lens unit data

| Unit | Leading surface | Focal length | Lens structure length | Front princiapl point position | Rear principal point position |
|---|---|---|---|---|---|
| 1 | 1 | 247.00 | 110.11 | 65.62 | −16.22 |
| 2 | 11 | −27.00 | 26.28 | 3.07 | −16.56 |
| 3 | 18 | 66.00 | 44.92 | 8.47 | −22.48 |
| 4 | 27 | 49.60 | 158.12 | 57.48 | 5.42 |

Single lens data

| Lens | Leading surface | Focal length |
|---|---|---|
| 1 | 1 | −438.96 |
| 2 | 3 | 505.93 |
| 3 | 5 | 780.33 |
| 4 | 7 | 609.21 |
| 5 | 9 | 776.41 |
| 6 | 11 | −43.50 |
| 7 | 13 | −39.38 |
| 8 | 15 | 39.00 |
| 9 | 16 | −69.28 |
| 10 | 18 | 121.50 |
| 11 | 20 | 303.06 |
| 12 | 22 | −138.43 |
| 13 | 23 | 104.13 |
| 14 | 25 | 447.82 |
| 15 | 28 | −19.23 |
| 16 | 29 | 23.34 |
| 17 | 31 | −139.32 |
| 18 | 33 | −22.46 |
| 19 | 34 | 30.19 |
| 20 | 36 | 205.89 |
| 21 | 38 | 73.84 |
| 22 | 40 | −34.60 |
| 23 | 41 | 48.80 |
| 24 | 43 | 84.07 |
| 25 | 44 | −102.63 |
| 26 | 46 | 129.29 |
| 27 | 48 | 0.00 |
| 28 | 49 | 0.00 |

Numerical Embodiment 3
Unit mm

Surface Data

| Surface Number | r | d | nd | vd | Effective diameter |
|---|---|---|---|---|---|
| 1 | 13269.513 | 4.00 | 1.83400 | 37.2 | 231.08 |
| 2 | 312.770 | 2.95 | | | 220.50 |
| 3 | 322.226 | 32.42 | 1.43387 | 95.1 | 220.12 |
| 4 | −670.694 | 17.41 | | | 218.77 |
| 5 | 361.874 | 22.28 | 1.43387 | 95.1 | 212.81 |
| 6 | −1698.628 | 0.25 | | | 212.52 |
| 7 | 272.342 | 23.90 | 1.43387 | 95.1 | 207.84 |
| 8 | −13227.433 | 1.20 | | | 206.75 |
| 9 | 157.070 | 21.63 | 1.49700 | 81.5 | 188.22 |
| 10 | 360.770 | (Variable) | | | 186.09 |
| 11* | 3198.004 | 2.00 | 2.00330 | 28.3 | 47.06 |
| 12 | 35.862 | 12.13 | | | 39.69 |
| 13 | −42.162 | 1.40 | 1.88300 | 40.8 | 38.81 |
| 14 | 75.915 | 10.85 | 1.92286 | 18.9 | 40.53 |
| 15 | −44.303 | 0.53 | | | 41.06 |
| 16 | −46.805 | 1.50 | 1.90366 | 31.3 | 40.30 |
| 17 | −144.079 | (Variable) | | | 40.85 |
| 18 | 129.486 | 8.80 | 0.00000 | 67.0 | 67.23 |
| 19 | −314.886 | 0.20 | | | 67.55 |
| 20 | 153.503 | 8.90 | 0.00000 | 67.0 | 67.97 |
| 21* | −338.493 | 0.50 | | | 67.52 |
| 22 | 77.899 | 2.50 | 1.84666 | 23.8 | 64.98 |
| 23 | 46.507 | 14.44 | 1.43875 | 94.9 | 61.11 |
| 24 | −951.118 | 0.20 | | | 60.43 |
| 25 | 346.891 | 4.67 | 0.00000 | 67.0 | 59.61 |
| 26* | 1062.112 | (Variable) | | | 58.36 |
| 27 (Stop) | ∞ | 2.79 | | | 29.94 |
| 28 | −94.024 | 1.40 | 1.88300 | 40.8 | 29.09 |
| 29 | 37.981 | 7.83 | 1.80809 | 22.8 | 28.51 |
| 30 | −99.611 | 2.36 | | | 28.18 |
| 31 | −54.344 | 4.50 | 1.80809 | 22.8 | 27.55 |
| 32 | −32.302 | 2.50 | 1.88300 | 40.8 | 27.64 |
| 33 | 197.278 | 9.06 | | | 28.02 |
| 34 | −322.352 | 2.00 | 1.72047 | 34.7 | 30.04 |
| 35 | 34.112 | 11.52 | 1.51633 | 64.1 | 31.15 |
| 36 | −40.263 | 0.20 | | | 32.71 |
| 37 | 970.953 | 16.24 | 1.62041 | 60.3 | 33.10 |
| 38 | −440.440 | 6.62 | | | 33.89 |
| 39 | −239.302 | 8.79 | 1.54072 | 47.2 | 34.10 |
| 40 | −42.544 | 1.00 | | | 34.51 |
| 41 | 156.508 | 2.50 | 1.88300 | 40.8 | 32.34 |
| 42 | 56.732 | 10.63 | 1.51633 | 64.1 | 31.16 |
| 43 | −39.517 | 2.00 | | | 29.82 |
| 44 | −39.054 | 6.69 | 1.51633 | 64.1 | 27.53 |
| 45 | −31.866 | 2.50 | 1.83400 | 37.2 | 26.09 |
| 46 | −811.084 | 1.20 | | | 26.41 |
| 47 | 55.470 | 5.88 | 1.51633 | 64.1 | 26.66 |
| 48 | −86.380 | 10.00 | | | 26.29 |
| 49 | ∞ | 33.00 | 1.60859 | 46.4 | 60.00 |
| 50 | ∞ | 13.20 | 1.51633 | 64.2 | 60.00 |
| 51 | ∞ | (Variable) | | | 60.00 |
| Image plane | ∞ | | | | |

Aspherical surface data

Eleventh surface

K = −1.60352e+005   A4 = 1.63123e−006   A6 = 3.75247e−009
A8 = 7.82902e−014   A10 = 8.01718e−015  A12 = 4.14621e−018
A3 = −5.15033e−008  A5 = −6.44453e−008  A7 = −1.54514e−010
A9 = 1.30553e−013   A11 = −5.11959e−016

Twenty-first surface

K = −3.11239e+001   A4 = −1.33224e−007  A6 = 1.28278e−011
A8 = 8.89465e−014   A10 = 3.21863e−018  A12 = −9.19335e−021
A3 = 3.68109e−006   A5 = 2.81653e−009   A7 = −3.19404e−012
A9 = 2.51253e−015   A11 = −1.41162e−018

Twenty-sixth surface

K = 1.03243e+003    A4 = 1.65574e−008   A6 = −4.20403e−010
A8 = 7.43445e−013   A10 = −2.60827e−016 A12 = −2.17014e−019

-continued

Numerical Embodiment 3
Unit mm

| A3 = −4.03501e−006 | A5 = 1.61400e−008 | A7 = −1.53015e−011 |
| A9 = −1.86081e−014 | A11 = 1.82843e−017 | |

Various data
Zoom ratio 100.00

| | Wide angle | Intermediate | Telephoto |
|---|---|---|---|
| Focal length | 8.00 | 80.00 | 800.00 |
| F-number | 0.00 | 0.00 | 0.00 |
| Angle of field | 0.00 | 0.00 | 0.00 |
| Image height | 5.50 | 5.50 | 5.50 |
| Total lens length | 624.43 | 624.43 | 624.43 |
| BF | 5.00 | 5.00 | 5.00 |
| d10 | 2.10 | 130.25 | 163.41 |
| d17 | 255.28 | 99.31 | 2.09 |
| d26 | 3.00 | 30.81 | 94.88 |
| d51 | 5.00 | 5.00 | 5.00 |
| Entrance pupil position | 129.69 | 935.31 | 9841.60 |
| Exit pupil position | 385.17 | 385.17 | 385.17 |
| Front principal point position | 137.86 | 1032.15 | 12325.06 |
| Rear principal point position | −3.00 | −75.00 | −795.00 |

Zoom lens unit data

| Unit | Leading surface | Focal length | Lens structure length | Front principal point position | Rear principal point position |
|---|---|---|---|---|---|
| 1 | 1 | 221.76 | 126.03 | 67.93 | −20.80 |
| 2 | 11 | −24.00 | 28.42 | 3.11 | −17.79 |
| 3 | 18 | 66.00 | 40.21 | 6.62 | −20.26 |
| 4 | 27 | 50.20 | 164.40 | 57.78 | 2.13 |

Single lens data

| Lens | Leading surface | Focal length |
|---|---|---|
| 1 | 1 | −381.70 |
| 2 | 3 | 505.41 |
| 3 | 5 | 688.11 |
| 4 | 7 | 613.83 |
| 5 | 9 | 539.05 |
| 6 | 11 | −35.86 |
| 7 | 13 | −30.35 |
| 8 | 14 | 31.31 |
| 9 | 16 | −76.71 |
| 10 | 18 | 155.59 |
| 11 | 20 | 178.96 |
| 12 | 22 | −140.11 |
| 13 | 23 | 101.25 |
| 14 | 25 | 864.95 |
| 15 | 28 | −30.31 |
| 16 | 29 | 34.56 |
| 17 | 31 | 89.35 |
| 18 | 32 | −31.09 |
| 19 | 34 | −42.43 |
| 20 | 35 | 37.62 |
| 21 | 37 | 488.61 |
| 22 | 39 | 93.74 |
| 23 | 41 | −101.39 |
| 24 | 42 | 46.70 |
| 25 | 44 | 253.57 |
| 26 | 45 | −39.58 |
| 27 | 47 | 66.11 |
| 28 | 49 | 0.00 |
| 29 | 50 | 0.00 |

Numerical Embodiment 4
Unit mm

Surface Data

| Surface Number | r | d | nd | νd | Effective diameter |
|---|---|---|---|---|---|
| 1 | −3048.814 | 4.00 | 1.83400 | 37.2 | 212.47 |
| 2 | 366.415 | 2.11 | | | 205.34 |
| 3 | 360.989 | 28.83 | 1.43387 | 95.1 | 205.02 |
| 4 | −533.108 | 19.51 | | | 203.96 |
| 5 | 468.789 | 17.87 | 1.43387 | 95.1 | 193.08 |
| 6 | −878.590 | 0.20 | | | 192.95 |
| 7 | 249.934 | 18.61 | 1.43387 | 95.1 | 188.74 |
| 8 | 1883.171 | 0.95 | | | 187.85 |
| 9 | 163.796 | 17.43 | 1.49700 | 81.5 | 176.12 |
| 10 | 367.373 | (Variable) | | | 174.48 |
| 11* | 2201.734 | 1.50 | 2.00330 | 28.3 | 41.76 |
| 12 | 56.234 | 4.88 | | | 37.63 |
| 13 | −156.786 | 1.50 | 2.00330 | 28.3 | 37.00 |
| 14 | 65.625 | 5.92 | | | 35.14 |
| 15 | −51.959 | 1.50 | 1.88300 | 40.8 | 35.04 |
| 16 | 58.657 | 9.22 | 1.92286 | 18.9 | 39.13 |
| 17 | −53.488 | 1.86 | | | 40.33 |
| 18 | −41.772 | 1.50 | 1.83400 | 37.2 | 40.59 |
| 19 | −55.483 | (Variable) | | | 42.48 |
| 20 | 115.329 | 12.25 | 0.00000 | 67.0 | 78.98 |
| 21 | −353.830 | 0.20 | | | 79.31 |
| 22 | 111.843 | 12.87 | 1.49700 | 81.5 | 79.71 |
| 23* | −250.239 | 0.20 | | | 79.00 |
| 24 | 80.402 | 2.50 | 1.84666 | 23.8 | 74.08 |
| 25 | 46.915 | 16.23 | 1.43875 | 94.9 | 68.35 |
| 26 | 374.805 | 2.00 | | | 67.29 |
| 27 | 359.126 | 4.80 | 0.00000 | 67.0 | 66.41 |
| 28* | −1118.305 | (Variable) | | | 65.38 |
| 29 (Stop) | ∞ | 2.92 | | | 29.92 |
| 30 | −94.519 | 1.40 | 1.88300 | 40.8 | 28.87 |
| 31 | 42.018 | 4.54 | 1.80809 | 22.8 | 28.28 |
| 32 | −436.305 | 3.17 | | | 28.00 |
| 33 | −72.809 | 1.40 | 1.77250 | 49.6 | 27.36 |
| 34 | 38.255 | 5.50 | 1.80518 | 25.4 | 27.44 |
| 35 | 404.110 | 5.88 | | | 27.43 |
| 36 | −42.718 | 2.00 | 1.83400 | 37.2 | 27.62 |
| 37 | 66.588 | 10.24 | 1.48749 | 70.2 | 29.62 |
| 38 | −29.140 | 1.75 | | | 31.73 |
| 39 | 52.488 | 15.82 | 1.59551 | 39.2 | 33.67 |
| 40 | −545.293 | 5.98 | | | 32.07 |
| 41 | −81.877 | 6.62 | 1.56883 | 56.4 | 30.95 |
| 42 | −46.592 | 0.96 | | | 30.91 |
| 43 | 186.636 | 2.10 | 1.83400 | 37.2 | 29.08 |
| 44 | 27.599 | 9.76 | 1.51823 | 58.9 | 27.47 |
| 45 | −208.745 | 0.38 | | | 26.67 |
| 46 | 334.796 | 7.68 | 1.51633 | 64.1 | 26.36 |
| 47 | −28.017 | 2.05 | 1.88300 | 40.8 | 25.42 |
| 48 | −120.763 | 2.31 | | | 25.57 |
| 49 | 120.993 | 5.53 | 1.51823 | 58.9 | 25.10 |
| 50 | −48.240 | 10.00 | | | 24.59 |
| 51 | ∞ | 33.00 | 1.60859 | 46.4 | 60.00 |
| 52 | ∞ | 13.20 | 1.51633 | 64.2 | 60.00 |
| 53 | ∞ | (Variable) | | | 60.00 |
| Image plane | ∞ | | | | |

Aspherical surface data

Eleventh surface

| K = 6.97499e+003 | A4 = 9.18463e−007 | A6 = 4.11463e−009 |
| A8 = −1.58605e−012 | A10 = 6.21612e−015 | A12 = 4.30037e−018 |
| A3 = −4.92829e−007 | A5 = −2.46518e−008 | A7 = −2.33050e−010 |
| A9 = 3.39551e−013 | A11 = −5.84422e−016 | |

Twenty-third surface

| K = −8.54920e+001 | A4 = −5.64531e−007 | A6 = −1.00051e−012 |
| A8 = 1.14452e−014 | A10 = −8.02194e−018 | A12 = −1.35982e−021 |

Numerical Embodiment 4
Unit mm

A3 = 6.43558e−007    A5 = 1.36927e−008    A7 = 8.65348e−013
A9 = −1.46107e−015    A11 = 4.42882e−019

Twenty-eighth surface

K = 1.03243e+003    A4 = 3.80625e−007    A6 = −7.45229e−010
A8 = 9.68593e−013    A10 = −3.01004e−016    A12 = 1.27214e−019
A3 = −8.30207e−007    A5 = 1.10122e−008    A7 = −7.47187e−013
A9 = −1.56677e−014    A11 = 4.48283e−018

Various data
Zoom ratio 108.00

|  | Wide angle | Intermediate | Telephoto |
|---|---|---|---|
| Focal length | 8.00 | 83.14 | 864.00 |
| F-number | 0.00 | 0.00 | 0.00 |
| Angle of field | 0.00 | 0.00 | 0.00 |
| Image height | 5.50 | 5.50 | 5.50 |
| Total lens length | 622.12 | 622.12 | 622.12 |
| BF | 4.90 | 4.90 | 4.90 |
| d10 | 2.41 | 143.91 | 178.89 |
| d19 | 270.17 | 102.56 | 2.34 |
| d28 | 2.00 | 28.12 | 93.35 |
| d53 | 4.90 | 4.90 | 4.90 |
| Entrance pupil position | 114.90 | 963.81 | 10725.87 |
| Exit pupil position | 446.18 | 446.18 | 446.18 |
| Front principal point position | 123.04 | 1062.61 | 13281.54 |
| Rear principal point position | −3.10 | −78.24 | −859.10 |

Zoom lens unit data

| Unit | Leading surface | Focal length | Lens structure length | Front principal point position | Rear principal point position |
|---|---|---|---|---|---|
| 1 | 1 | 231.69 | 109.50 | 62.91 | −15.29 |
| 2 | 11 | −24.00 | 27.89 | 2.30 | −19.75 |
| 3 | 20 | 66.00 | 51.05 | 8.80 | −26.68 |
| 4 | 29 | 50.50 | 154.20 | 57.08 | 8.08 |

Single lens data

| Lens | Leading surface | Focal length |
|---|---|---|
| 1 | 1 | −389.51 |
| 2 | 3 | 499.74 |
| 3 | 5 | 705.62 |
| 4 | 7 | 660.27 |
| 5 | 9 | 576.58 |
| 6 | 11 | −57.06 |
| 7 | 13 | −45.57 |
| 8 | 15 | −30.83 |
| 9 | 16 | 31.18 |
| 10 | 18 | −211.98 |
| 11 | 20 | 147.84 |
| 12 | 22 | 156.93 |
| 13 | 24 | −136.44 |
| 14 | 25 | 120.11 |
| 15 | 27 | 458.09 |
| 16 | 30 | −32.59 |
| 17 | 31 | 47.15 |
| 18 | 33 | −32.13 |
| 19 | 34 | 51.65 |
| 20 | 36 | −30.75 |
| 21 | 37 | 42.95 |
| 22 | 39 | 80.72 |
| 23 | 41 | 177.18 |
| 24 | 43 | −38.82 |
| 25 | 44 | 47.52 |
| 26 | 46 | 50.25 |
| 27 | 47 | −41.51 |
| 28 | 49 | 67.03 |
| 29 | 51 | 0.00 |
| 30 | 52 | 0.00 |

Numerical Embodiment 5
Unit mm
Surface Data

| Surface Number | r | d | nd | vd | Effective diameter |
|---|---|---|---|---|---|
| 1 | 448.419 | 4.00 | 1.80100 | 35.0 | 197.52 |
| 2 | 212.684 | 0.85 |  |  | 188.74 |
| 3 | 211.447 | 24.52 | 1.43387 | 95.1 | 188.49 |
| 4 | 6849.858 | 18.32 |  |  | 187.10 |
| 5 | 257.592 | 21.59 | 1.43387 | 95.1 | 176.92 |
| 6 | −2037.002 | 0.25 |  |  | 174.33 |
| 7 | 248.784 | 15.76 | 1.43875 | 94.9 | 165.40 |
| 8 | 3052.907 | 0.99 |  |  | 164.20 |
| 9 | 145.384 | 10.81 | 1.45600 | 90.3 | 151.00 |
| 10 | 219.063 | (Variable) |  |  | 148.83 |
| 11 | 3865.185 | 2.00 | 2.00330 | 28.3 | 45.05 |
| 12 | 41.625 | 8.74 |  |  | 39.05 |
| 13 | −65.788 | 1.90 | 1.83400 | 37.2 | 38.32 |
| 14 | 305.044 | 4.78 |  |  | 37.95 |
| 15 | −55.103 | 1.90 | 1.76200 | 40.1 | 37.93 |
| 16 | 81.848 | 7.67 | 1.92286 | 18.9 | 40.27 |
| 17 | −76.288 | (Variable) |  |  | 40.81 |
| 18 | 324.833 | 7.08 | 1.59240 | 68.3 | 57.06 |
| 19 | −127.525 | 0.20 |  |  | 57.61 |
| 20* | 138.031 | 6.82 | 1.49700 | 81.5 | 58.07 |
| 21 | −340.503 | 0.20 |  |  | 57.83 |
| 22 | 68.786 | 2.50 | 1.80515 | 25.5 | 56.13 |
| 23 | 42.833 | 12.66 | 1.49700 | 81.5 | 53.15 |
| 24 | 807.348 | (Variable) |  |  | 51.92 |
| 25 (Stop) | ∞ | 3.08 |  |  | 29.53 |
| 26 | −71.873 | 1.80 | 1.81600 | 46.6 | 28.78 |
| 27 | 65.233 | 5.93 | 1.80809 | 22.8 | 28.50 |
| 28 | −348.521 | 9.47 |  |  | 28.27 |
| 29 | −123.362 | 3.60 | 1.81600 | 46.6 | 26.73 |
| 30 | 38.290 | 14.61 | 1.78472 | 25.7 | 26.77 |
| 31 | 114.237 | 15.00 |  |  | 26.99 |
| 32 | 5487.241 | 9.10 | 1.48749 | 70.2 | 30.15 |
| 33 | −47.510 | 0.53 |  |  | 31.10 |
| 34 | −391.597 | 2.10 | 1.80518 | 25.4 | 30.76 |
| 35 | 82.401 | 8.93 | 1.48749 | 70.2 | 30.64 |
| 36 | −51.883 | 0.20 |  |  | 30.88 |
| 37 | −801.568 | 8.23 | 1.51823 | 58.9 | 30.29 |
| 38 | −41.352 | 2.10 | 1.83400 | 37.2 | 29.46 |
| 39 | −91.402 | 1.23 |  |  | 29.51 |
| 40 | 58.749 | 7.61 | 1.51633 | 64.1 | 28.44 |
| 41 | −685.478 | 5.00 |  |  | 26.51 |
| 42 | ∞ | 33.00 | 1.60859 | 46.4 | 60.00 |
| 43 | ∞ | 13.20 | 1.51633 | 64.2 | 60.00 |
| 44 | ∞ | (Variable) |  |  | 60.00 |
| Image plane | ∞ |  |  |  |  |

Aspherical surface data
Twentieth surface

K = −9.57673e−001    A4 = 3.52225e−008    A6 = −2.48997e−011
A8 = 3.23822e−014    A10 = −7.51296e−018    A12 = 1.56309e−021

Various data
Zoom ratio 65.00

| Focal length | 8.80 | 24.99 | 70.95 | 201.45 | 572.00 | 12.62 |
|---|---|---|---|---|---|---|
| F-number | 1.90 | 1.90 | 1.90 | 1.95 | 3.30 | 1.90 |
| Angle of field | 32.01 | 12.41 | 4.43 | 1.56 | 0.55 | 23.55 |

-continued

Numerical Embodiment 5
Unit mm

| | | | | | | |
|---|---|---|---|---|---|---|
| Image height | 5.50 | 5.50 | 5.50 | 5.50 | 5.50 | 5.50 |
| Total lens length | 555.12 | 555.12 | 555.12 | 555.12 | 555.12 | 555.12 |
| BF | 15.00 | 15.00 | 15.00 | 15.00 | 15.00 | 15.00 |
| d10 | 3.39 | 76.44 | 117.39 | 139.65 | 151.40 | 33.39 |
| d17 | 234.91 | 151.46 | 95.30 | 50.78 | 5.50 | 201.76 |
| d24 | 3.54 | 13.95 | 29.15 | 51.42 | 84.95 | 6.69 |
| d44 | 15.00 | 15.00 | 15.00 | 15.00 | 15.00 | 15.00 |
| Entrance pupil position | 121.85 | 356.73 | 795.70 | 1763.65 | 5772.74 | 187.44 |
| Exit pupil position | 243.30 | 243.30 | 243.30 | 243.30 | 243.30 | 243.30 |
| Front principal point position | 130.99 | 384.45 | 888.70 | 2142.86 | 7777.90 | 200.76 |
| Rear principal point position | 6.20 | −9.99 | −55.95 | −186.45 | −557.00 | 2.38 |

Zoom lens unit data

| Unit | Leading surface | Focal length | Lens structure length | Front principal point position | Rear principal point position |
|---|---|---|---|---|---|
| 1 | 1 | 219.22 | 97.11 | 46.96 | −26.36 |
| 2 | 11 | −26.00 | 26.99 | 2.25 | −19.81 |
| 3 | 18 | 65.00 | 29.47 | 4.69 | −14.47 |
| 4 | 25 | 46.65 | 144.71 | 58.21 | 8.47 |

Single lens data

| Lens | Leading surface | Focal length |
|---|---|---|
| 1 | 1 | −505.52 |
| 2 | 3 | 501.05 |
| 3 | 5 | 527.24 |
| 4 | 7 | 614.73 |
| 5 | 9 | 903.82 |
| 6 | 11 | −41.60 |
| 7 | 13 | −64.33 |
| 8 | 15 | −42.71 |
| 9 | 16 | 43.28 |
| 10 | 18 | 154.95 |
| 11 | 20 | 197.98 |
| 12 | 22 | −146.02 |
| 13 | 23 | 90.25 |
| 14 | 26 | −41.45 |
| 15 | 27 | 67.74 |
| 16 | 29 | −35.27 |
| 17 | 30 | 67.03 |
| 18 | 32 | 96.35 |
| 19 | 34 | −83.61 |
| 20 | 35 | 66.54 |
| 21 | 37 | 83.49 |
| 22 | 38 | −91.73 |
| 23 | 40 | 104.78 |
| 24 | 42 | 0.00 |
| 25 | 43 | 0.00 |

Numerical Embodiment 6
Unit mm

Surface Data

| Surface Number | r | d | nd | vd | Effective diameter |
|---|---|---|---|---|---|
| 1 | 563.041 | 4.00 | 1.83400 | 37.2 | 209.29 |
| 2 | 214.634 | 0.43 | | | 199.03 |
| 3 | 210.123 | 26.91 | 1.43387 | 95.1 | 198.90 |
| 4 | 4352.387 | 21.78 | | | 197.68 |
| 5 | 412.773 | 15.85 | 1.43387 | 95.1 | 193.36 |
| 6 | −2501.429 | 0.50 | | | 193.18 |
| 7 | 319.038 | 22.93 | 1.43875 | 94.9 | 190.87 |
| 8 | −782.090 | 0.77 | | | 190.15 |
| 9 | 135.854 | 16.34 | 1.49700 | 81.5 | 170.55 |
| 10 | 232.566 | (Variable) | | | 168.76 |
| 11 | 1256.346 | 2.00 | 1.90366 | 31.3 | 47.63 |
| 12 | 35.337 | 10.64 | | | 40.08 |
| 13 | −60.690 | 1.50 | 1.88300 | 40.8 | 39.42 |
| 14 | 47.323 | 6.51 | 1.80809 | 22.8 | 39.75 |
| 15 | 486.018 | 0.10 | | | 39.94 |
| 16 | 85.691 | 7.50 | 1.80809 | 22.8 | 40.36 |
| 17 | −67.397 | 1.50 | 1.88300 | 40.8 | 40.14 |
| 18 | 412.528 | (Variable) | | | 39.75 |
| 19 | 324.833 | 7.72 | 1.59240 | 68.3 | 61.41 |
| 20 | −125.693 | 0.20 | | | 61.99 |
| 21* | 163.515 | 7.33 | 1.49700 | 81.5 | 62.61 |
| 22 | −628.204 | 0.20 | | | 62.36 |
| 23 | 80.348 | 2.50 | 1.80515 | 25.5 | 61.25 |
| 24 | 46.198 | 12.76 | 1.49700 | 81.5 | 58.21 |
| 25 | 6677.954 | 1.00 | | | 57.64 |
| 26 | 257.775 | 4.79 | 1.61800 | 63.3 | 56.79 |
| 27 | −1002.846 | (Variable) | | | 55.96 |
| 28 (Stop) | ∞ | 3.08 | | | 31.34 |
| 29 | −68.398 | 1.80 | 1.81600 | 46.6 | 30.61 |
| 30 | 40.558 | 5.93 | 1.80809 | 22.8 | 30.16 |
| 31 | ∞ | 9.47 | | | 29.95 |
| 32 | −232.917 | 3.60 | 1.81600 | 46.6 | 28.82 |
| 33 | 82.935 | 14.61 | 1.78472 | 25.7 | 28.76 |
| 34 | 97.270 | 15.00 | | | 28.65 |
| 35 | 171.862 | 9.06 | 1.48749 | 70.2 | 31.98 |
| 36 | −50.479 | 0.53 | | | 32.48 |
| 37 | −307.032 | 2.50 | 1.83403 | 37.2 | 31.91 |
| 38 | 60.597 | 8.93 | 1.49700 | 81.5 | 31.60 |
| 39 | −71.414 | 0.20 | | | 31.83 |
| 40 | 293.937 | 7.92 | 1.49700 | 81.5 | 31.44 |
| 41 | −50.753 | 2.50 | 1.88300 | 40.8 | 30.71 |
| 42 | −79.184 | 1.23 | | | 30.78 |
| 43 | 80.900 | 7.61 | 1.48749 | 70.2 | 29.45 |
| 44 | −325.733 | 5.00 | | | 27.42 |
| 45 | ∞ | 33.00 | 1.60859 | 46.4 | 60.00 |
| 46 | ∞ | 13.20 | 1.51633 | 64.2 | 60.00 |
| 47 | ∞ | (Variable) | | | 60.00 |
| Image plane | ∞ | | | | |

Aspherical surface data
Twenty-first surface

K = 9.30831e−001  A4 = −8.10486e−008  A6 = 2.59343e−010
A8 = −6.02207e−013  A10 = 5.84188e−016  A12 = −1.94896e−019

Various data
Zoom ratio 76.00

| | | | | | |
|---|---|---|---|---|---|
| Focal length | 8.70 | 21.42 | 75.84 | 249.00 | 661.20 |
| F-number | 1.85 | 1.85 | 1.85 | 1.97 | 3.45 |
| Angle of field | 32.30 | 14.40 | 4.15 | 1.27 | 0.48 |
| Image height | 5.50 | 5.50 | 5.50 | 5.50 | 5.50 |

Numerical Embodiment 6
Unit mm

| | | | | | |
|---|---|---|---|---|---|
| Total lens length | 586.62 | 586.62 | 586.62 | 586.62 | 586.62 |
| BF | 15.00 | 15.00 | 15.00 | 15.00 | 15.00 |
| d10 | 3.28 | 73.28 | 128.04 | 153.28 | 163.92 |
| d18 | 244.90 | 166.97 | 95.58 | 45.84 | 4.48 |
| d27 | 2.50 | 10.42 | 27.06 | 51.56 | 82.27 |
| d47 | 15.00 | 15.00 | 15.00 | 15.00 | 15.00 |
| Entrance pupil position | 128.17 | 323.96 | 854.34 | 2124.23 | 6673.31 |
| Exit pupil position | 313.81 | 313.81 | 313.81 | 313.81 | 313.81 |
| Front principal point position | 137.12 | 346.92 | 949.44 | 2580.72 | 8797.60 |
| Rear principal point position | 6.30 | −6.42 | −60.84 | −234.00 | −646.20 |

Zoom lens unit data

| Unit | Leading surface | Focal length | Lens structure length | Front principal point position | Rear principal point position |
|---|---|---|---|---|---|
| 1 | 1 | 229.26 | 109.51 | 58.42 | −22.71 |
| 2 | 11 | −25.50 | 29.75 | 4.01 | −16.23 |
| 3 | 19 | 63.00 | 36.50 | 8.28 | −16.44 |
| 4 | 28 | 49.47 | 145.16 | 59.22 | 13.38 |

Single lens data

| Lens | Leading surface | Focal length |
|---|---|---|
| 1 | 1 | −415.44 |
| 2 | 3 | 506.59 |
| 3 | 5 | 815.92 |
| 4 | 7 | 518.47 |
| 5 | 9 | 620.53 |
| 6 | 11 | −39.97 |
| 7 | 13 | −29.74 |
| 8 | 14 | 63.79 |
| 9 | 16 | 47.25 |
| 10 | 17 | −65.13 |
| 11 | 19 | 153.43 |
| 12 | 21 | 261.10 |
| 13 | 23 | −138.30 |
| 14 | 24 | 93.27 |
| 15 | 26 | 331.06 |
| 16 | 29 | −30.81 |
| 17 | 30 | 49.69 |
| 18 | 32 | −74.19 |
| 19 | 33 | 489.95 |
| 20 | 35 | 80.85 |
| 21 | 37 | −60.11 |
| 22 | 38 | 67.28 |
| 23 | 40 | 87.50 |
| 24 | 41 | −166.02 |
| 25 | 43 | 133.31 |
| 26 | 45 | 0.00 |
| 27 | 46 | 0.00 |

TABLE 1

| Conditional Expression | Contents of Expression | Embodiment 1 | Embodiment 2 | Embodiment 3 | Embodiment 4 | Embodiment 5 | Embodiment 6 |
|---|---|---|---|---|---|---|---|
| (1a) | f1/|f2| | 8.831 | 9.148 | 9.240 | — | 8.432 | — |
| (2a) | f21/f2 | 1.281 | 1.611 | 1.494 | — | 1.600 | — |
| (3a) | O12/D2 | 0.081 | 0.117 | 0.109 | — | 0.083 | — |
| (4a) | D2/|f21| | 0.851 | 0.604 | 0.786 | — | 0.649 | — |
| (5a) | f2k/f21 | 3.611 | 1.593 | 2.139 | — | 1.027 | — |
| (1b) | f1/|f2| | — | — | — | 9.654 | — | 8.990 |
| (2b) | f2n/f2 | — | — | — | 1.003 | — | 0.862 |
| (3b) | O12/D2 | — | — | — | 0.083 | — | 0.135 |
| (4b) | D2/|f2n| | — | — | — | 1.158 | — | 1.354 |
| (5b) | f2k/f2n | — | — | — | 8.806 | — | 2.964 |
| (6) | (R1 + R2)/(R1 − R2) | 1.022 | 1.024 | 1.023 | 1.052 | 1.022 | 1.058 |
| (7) | N21 | 2.003 | 2.003 | 2.003 | 2.003 | 2.003 | 1.904 |
| (8) | ν21 | 28.3 | 28.3 | 28.3 | 28.3 | 28.3 | 31.3 |
| (9) | N2p | 1.923 | 1.923 | 1.923 | 1.923 | 1.923 | 1.808 |
| (10) | ν2p | 18.9 | 18.9 | 18.9 | 18.9 | 18.9 | 22.8 |
| (11) | ft/fw | 85 | 92 | 100 | 108 | 65 | 76 |
| (12) | 2ωw | 67.06 | 65.81 | 69.02 | 69.02 | 64.01 | 64.6 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-206634, filed Sep. 15, 2010, which is hereby incorporated by reference herein in its entirety.

What is claimed is:

1. A zoom lens, comprising in order from an object side to an image side:
a first lens unit including a focusing lens unit and having a positive refractive power;
a second lens unit having a negative refractive power and moving for magnification-varying;
a third lens unit moving for magnification-varying; and
a fourth lens unit having a positive refractive power,
wherein the second lens unit comprises four lenses as a whole including a first lens having a negative refractive power and a second lens having a negative refractive power, and the first lens and the second lens are disposed successively in order from the object side to the image side, and
wherein the following conditional expressions are satisfied:

$7.8 < f1/|f2| < 12.0;$ $1.20 < f21/f2 < 1.63;$ and $0.04 < O12/D2 < 0.15,$ where f1 represents a focal length of the first lens unit, f2 represents a focal length of the second lens unit, f21 represents a focal length of the first lens, O12 represents a distance from a lens surface vertex of the first lens on the object side to an object side principal point position of the second lens unit, and D2 represents a thickness of the second lens unit on an optical axis.

2. A zoom lens according to claim 1, wherein the following conditional expression is satisfied:

$0.55 < D2/|f21| < 0.98,$ where D2 represents the thickness of the second lens unit on the optical axis and f21 represents the focal length of the first lens.

3. A zoom lens according to claim 1,
wherein the second lens unit includes a k-lens which is disposed on the most image side and has a negative refractive power, and
wherein the following conditional expression is satisfied:

$0.95 < f2k/f21 < 3.92,$ where f2k represents a focal length of the k-lens.

4. A zoom lens according to claim 1, wherein the following conditional expressions are satisfied:

$0.8 < (R1+R2)/(R1-R2) < 1.2;$ $1.75 < N21 < 2.30;$ and $18 < v21 < 50,$ where R1 represents a curvature radius of a lens surface of the first lens on the object side, R2 represents a curvature radius of a lens surface of the first lens on the image side, N21 represents a refractive index of a material forming the first lens, and v21 represents an Abbe number of the material forming the first lens.

5. A zoom lens according to claim 1,
wherein the second lens unit includes a p-lens having a positive refractive power, and
wherein the following conditional expressions are satisfied:

$1.7 < N2p < 2.1;$ and $16 < v2p < 30,$ where N2p represents a refractive power of a material forming the p-lens, and v2p represents an Abbe number of the material forming the p-lens.

6. A zoom lens according to claim 1, wherein the fourth lens unit includes a partial lens unit which is removable from an optical path and the zoom lens changes a range of a focal length of an entire system of the zoom lens by withdrawing the partial lens unit from the optical path.

7. A zoom lens, comprising in order from an object side to an image side:
a first lens unit including a focusing lens unit and having a positive refractive power;
a second lens unit having a negative refractive power and moving for magnification-varying;
a third lens unit moving for magnification-varying; and
a fourth lens unit having a positive refractive power,
wherein the second lens unit comprises five lenses as a whole including a first lens having a negative refractive power and a second lens having a negative refractive power, and the first lens and the second lens are disposed successively in order from the object side to the image side, and
wherein the following conditional expressions are satisfied:

$8.0 < f1/|f2| < 13.5;$ $0.65 < f2n/f2 < 1.85;$ and $0.03 < O12/D2 < 0.18,$ where f1 represents a focal length of the first lens unit, f2 represents a focal length of the second lens unit, f2n represents a combined focal length of the first lens and the second lens, O12 represents a distance from a lens surface vertex of the first lens on the object side to an object side principal point position of the second lens unit, and D2 represents a thickness of the second lens unit on an optical axis.

8. A zoom lens according to claim 7, wherein the following conditional expression is satisfied:

$0.80 < D2/|f2n| < 1.60,$ where D2 represents the thickness of the second lens unit on the optical axis and f2n represents the combined focal length of the first lens and the second lens.

9. A zoom lens according to claim 7,
wherein the second lens unit includes a k-lens which is disposed on the most image side and has a negative refractive power, and
wherein the following conditional expression is satisfied:

$2.0 < f2k/f2n < 10.0,$ where f2k represents a focal length of the k-lens.

10. An image pickup apparatus, comprising:
a zoom lens comprising in order from an object side to an image side:
a first lens unit including a focusing lens unit and having a positive refractive power;
a second lens unit having a negative refractive power and moving during zooming;

a third lens unit moving during zooming; and
a fourth lens unit having a positive refractive power,
wherein the second lens unit comprises four lenses as a whole including a first lens having a negative refractive power and a second lens having a negative refractive power, and the first lens and the second lens are disposed adjacent to each other in order from the object side to the image side, and wherein the following conditional expressions are satisfied:

$7.8 < f1/|f2| < 12.0;$ $1.20 < f21/f2 < 1.63;$ and $0.04 < O12/D2 < 0.15,$ where f1 represents a focal length of the first lens unit, f2 represents a focal length of the second lens unit, f21 represents a focal length of the first lens, O12 represents a distance from a lens surface vertex of the first lens on the object side to an object side principal point position of the second lens unit, and D2 represents a thickness of the second lens unit on an optical axis; and
a solid-state image pickup element for receiving light of an image formed by the zoom lens.

11. An image pickup apparatus according to claim 10, wherein the following conditional expressions are satisfied:

$60 < ft/fw < 115;$ and $62.9 < \omega w < 70.0,$ where ωw represents an angle of field of the zoom lens at a wide-angle end, fw represents a focal length of an entire system of the zoom lens at the wide-angle end, and ft represents a focal length of the entire system of the zoom lens at a telephoto end.

12. An image pickup apparatus, comprising:
a zoom lens comprising in order from an object side to an image side:
a first lens unit including a focusing lens unit and having a positive refractive power;
a second lens unit having a negative refractive power and moving during zooming;
a third lens unit moving during zooming; and
a fourth lens unit having a positive refractive power, wherein the second lens unit comprises five lenses as a whole including a first lens having a negative refractive power and a second lens having a negative refractive power, and the first lens and the second lens are disposed adjacent to each other in order from the object side to the image side, and wherein the following conditional expressions are satisfied:

$8.0 < f1/|f2| < 13.5;$ $0.65 < f2n/f2 < 1.85;$ and $0.03 < O12/D2 < 0.18,$ where f1 represents a focal length of the first lens unit, f2 represents a focal length of the second lens unit, f2n represents a combined focal length of the first lens and the second lens, O12 represents a distance from a lens surface vertex of the first lens on the object side to an object side principal point position of the second lens unit, and D2 represents a thickness of the second lens unit on an optical axis; and
a solid-state image pickup element for receiving light of an image formed by the zoom lens.

13. A zoom lens, comprising in order from an object side to an image side:
a first lens unit including a focusing lens unit and having a positive refractive power;
a second lens unit having a negative refractive power and moving during zooming;
a third lens unit moving during zooming; and
a fourth lens unit having a positive refractive power, wherein the second lens unit comprises plural lenses including a first lens having a negative refractive power which is disposed at the most object side, and
wherein the following conditional expressions are satisfied:

$7.8 < f1/|f2| < 12.0;$ $1.20 < f21/f2 < 1.63;$ and $0.04 < O12/D2 < 0.15,$ where f1 represents a focal length of the first lens unit, f2 represents a focal length of the second lens unit, f21 represents a focal length of the first lens, O12 represents a distance from a lens surface vertex of the first lens on the object side to an object side principal point position of the second lens unit, and D2 represents a thickness of the second lens unit on an optical axis.

14. A zoom lens according to claim 13, wherein the following conditional expression is satisfied:

$0.55 < D2/|f21| < 0.98,$ where D2 represents the thickness of the second lens unit on the optical axis and f21 represents the focal length of the first lens.

15. A zoom lens according to claim 13,
wherein the second lens unit includes a k-lens which is disposed on the most image side and has a negative refractive power, and
wherein the following conditional expression is satisfied:

$0.95 < f2k/f21 < 3.92,$ where f2k represents a focal length of the k-lens.

16. A zoom lens, comprising in order from an object side to an image side:
a first lens unit including a focusing lens unit and having a positive refractive power;
a second lens unit having a negative refractive power and moving during zooming;
a third lens unit moving during zooming; and
a fourth lens unit having a positive refractive power, wherein the second lens unit comprises plural lenses including a first lens having a negative refractive power which is disposed at the most object side, and a second lens having a negative refractive power, and
wherein the following conditional expressions are satisfied:

$8.0 < f1/|f2| < 13.5;$ $0.65 < f2n/f2 < 1.85;$ and $0.03 < O12/D2 < 0.18,$ where f1 represents a focal length of the first lens unit, f2 represents a focal length of the second lens unit, f2n represents a combined focal length of the first lens and the second lens, O12 represents a distance from a lens surface vertex of the first lens on the object side to an object side principal point position of the second lens unit, and D2 represents a thickness of the second lens unit on an optical axis.

17. A zoom lens according to claim 16, wherein the following conditional expression is satisfied:

$$0.80 < D2/|f2n| < 1.60,$$

where D2 represents the thickness of the second lens unit on the optical axis and f2n represents the combined focal length of the first lens and the second lens.

18. A zoom lens according to claim 16,
wherein the second lens unit includes a k-lens which is disposed on the most image side and has a negative refractive power, and
wherein the following conditional expression is satisfied:

$$2.0 < f2k/f2n < 10.0,$$

where f2k represents a focal length of the k-lens.

19. An image pickup apparatus, comprising:
a zoom lens, comprising in order from an object side to an image side:
a first lens unit including a focusing lens unit and having a positive refractive power;
a second lens unit having a negative refractive power and moving during zooming;
a third lens unit moving during zooming; and
a fourth lens unit having a positive refractive power,
wherein the second lens unit comprises plural lenses including a first lens having a negative refractive power which is disposed at the most object side, and wherein the following conditional expressions are satisfied:

$$7.8 < f1|f2| < 12.0;$$

$$1.20 < f21/f2 < 1.63; \text{ and}$$

$$0.04 < O12/D2 < 0.15,$$

where f1 represents a focal length of the first lens unit, f2 represents a focal length of the second lens unit, f21 represents a focal length of the first lens, O12 represents a distance from a lens surface vertex of the first lens on the object side to an object side principal point position of the second lens unit, and D2 represents a thickness of the second lens unit on an optical axis; and
a solid-state image pickup element for receiving light of an image formed by the zoom lens.

* * * * *